United States Patent
Bishop et al.

(10) Patent No.: US 9,441,632 B2
(45) Date of Patent: Sep. 13, 2016

(54) SUMP PUMP REMOTE MONITORING SYSTEMS AND METHODS

(71) Applicant: Pentair Flow Technologies, LLC, Delavan, WI (US)

(72) Inventors: Michael B. Bishop, Twin Lakes, WI (US); Jeffrey C. Ambrose, Elkhorn, WI (US); Thomas G. Boese, Rockford, IL (US)

(73) Assignee: Pentair Flow Technologies, LLC, Delavan, WI (US)

( * ) Notice: Subject to any disclaimer, the term of this patent is extended or adjusted under 35 U.S.C. 154(b) by 0 days.

(21) Appl. No.: 14/800,339

(22) Filed: Jul. 15, 2015

(65) Prior Publication Data

US 2015/0316063 A1     Nov. 5, 2015

Related U.S. Application Data

(62) Division of application No. 13/660,779, filed on Oct. 25, 2012.

(51) Int. Cl.
| | |
|---|---|
| F04B 49/02 | (2006.01) |
| F04D 15/00 | (2006.01) |
| G01F 23/18 | (2006.01) |
| F04B 49/06 | (2006.01) |
| G05B 15/02 | (2006.01) |

(Continued)

(52) U.S. Cl.
CPC .............. *F04D 15/00* (2013.01); *F04B 17/03* (2013.01); *F04B 17/06* (2013.01); *F04B 23/021* (2013.01); *F04B 49/06* (2013.01); *F04B 49/08* (2013.01); *F04D 15/0072* (2013.01); *G01F 23/18* (2013.01); *G05B 15/02* (2013.01); *F04B 2203/0209* (2013.01)

(58) Field of Classification Search
CPC ...... F04B 23/021; F04B 43/04; F04B 47/00; F04B 49/02; F04B 49/025; F04B 49/065; F04D 13/086; F04D 15/0066; F04D 15/0209; F04D 15/0218; F04D 15/0245; F04D 15/0673; G01F 23/263; G01F 23/268
USPC ........................................ 417/36, 38; 307/66
See application file for complete search history.

(56) References Cited

U.S. PATENT DOCUMENTS

| | | |
|---|---|---|
| 981,213 A | 1/1911 | Mollitor |
| 3,316,843 A | 5/1967 | Vaughn |

(Continued)

OTHER PUBLICATIONS

Flotec Owner's Manual, dated 2004. 44 pages.

(Continued)

*Primary Examiner* — Patrick Hamo
(74) *Attorney, Agent, or Firm* — Quarles & Brady LLP

(57) ABSTRACT

Systems and methods for sump pump remote monitoring can include control circuitry integrated into a portable housing, with a backup sump pump connected to the control circuitry. The control circuitry can be powered by a line power and when the line power is not available, the control circuitry can be powered by a battery power. The control circuitry can be connected to a control panel, and the control circuitry can include a pressure transducer, the pressure transducer to measure a pressure in a fluid level sensor, and based on the measured pressure, the control circuitry to adjust the speed of the backup sump pump. A wireless controller can be connected to the control circuitry, the wireless controller for wirelessly receiving monitoring instructions and wirelessly transmitting backup sump pump status data, with the control circuitry providing an indication of the backup sump pump status data to the control panel.

10 Claims, 20 Drawing Sheets

(51) Int. Cl.
- *F04B 17/03* (2006.01)
- *F04B 17/06* (2006.01)
- *F04B 23/02* (2006.01)
- *F04B 49/08* (2006.01)

(56) References Cited

U.S. PATENT DOCUMENTS

| | | | |
|---|---|---|---|
| 3,634,842 A | 1/1972 | Niedermeyer | |
| 3,726,606 A | 4/1973 | Peters | |
| 3,735,233 A | 5/1973 | Ringle | |
| 3,753,072 A | 8/1973 | Jurgens | |
| 3,814,544 A | 6/1974 | Roberts et al. | |
| 3,910,725 A | 10/1975 | Rule | |
| 3,941,507 A | 3/1976 | Niedermeyer | |
| 3,972,647 A | 8/1976 | Niedermeyer | |
| 3,987,240 A | 10/1976 | Schultz | |
| 4,087,204 A | 5/1978 | Niedermeyer | |
| 4,108,547 A | 8/1978 | Stemmle | |
| 4,169,377 A * | 10/1979 | Scheib | G01F 23/241 73/304 R |
| 4,187,503 A | 2/1980 | Walton | |
| 4,215,975 A | 8/1980 | Niederemeyer | |
| 4,222,711 A | 9/1980 | Mayer | |
| 4,228,427 A | 10/1980 | Niedermeyer | |
| 4,233,553 A | 11/1980 | Prince et al. | |
| 4,255,747 A | 3/1981 | Bunia | |
| 4,309,157 A | 1/1982 | Niedermeyer | |
| 4,369,438 A | 1/1983 | Wilhelmi | |
| 4,456,432 A | 6/1984 | Mannino | |
| 4,529,359 A | 7/1985 | Sloan | |
| 4,552,512 A | 11/1985 | Gallup et al. | |
| 4,564,041 A | 1/1986 | Kramer | |
| 4,652,802 A | 3/1987 | Johnston | |
| 4,668,902 A | 5/1987 | Zeller | |
| 4,766,329 A | 8/1988 | Santiago | |
| 4,789,307 A | 12/1988 | Sloan | |
| 4,806,457 A | 2/1989 | Yanagisawa | |
| 5,015,152 A | 5/1991 | Greene | |
| 5,051,068 A | 9/1991 | Wong | |
| 5,129,264 A | 7/1992 | Lorenc | |
| 5,135,359 A | 8/1992 | Dufresne | |
| 5,166,595 A | 11/1992 | Leverich | |
| 5,222,867 A | 6/1993 | Walker et al. | |
| 5,234,319 A | 8/1993 | Wilder | |
| 5,238,369 A | 8/1993 | Farr | |
| 5,319,298 A | 6/1994 | Wanzong et al. | |
| 5,349,281 A | 9/1994 | Bugaj | |
| 5,352,969 A | 10/1994 | Gilmore et al. | |
| 5,425,624 A | 6/1995 | Williams | |
| 5,449,274 A | 9/1995 | Kochan | |
| 5,449,997 A | 9/1995 | Gilmore et al. | |
| 5,522,707 A | 6/1996 | Potter | |
| 5,529,462 A | 6/1996 | Hawes | |
| 5,562,422 A | 10/1996 | Ganzon et al. | |
| 5,629,601 A | 5/1997 | Feldstein | |
| 5,640,078 A | 6/1997 | Kou et al. | |
| 5,669,323 A | 9/1997 | Pritchard | |
| 5,672,050 A | 9/1997 | Webber et al. | |
| 5,708,348 A | 1/1998 | Frey et al. | |
| 5,712,795 A | 1/1998 | Layman et al. | |
| 5,780,992 A | 7/1998 | Beard | |
| 5,906,479 A | 5/1999 | Hawes | |
| 5,986,433 A | 11/1999 | Peele et al. | |
| 6,125,883 A | 10/2000 | Creps et al. | |
| 6,146,108 A | 11/2000 | Mullendore | |
| 6,150,776 A | 11/2000 | Potter et al. | |
| 6,184,650 B1 | 2/2001 | Gelbman | |
| 6,188,200 B1 | 2/2001 | Maiorano | |
| 6,198,257 B1 | 3/2001 | Belehradek et al. | |
| 6,203,282 B1 | 3/2001 | Morin | |
| 6,257,833 B1 | 7/2001 | Bates | |
| 6,364,620 B1 | 4/2002 | Fletcher et al. | |
| 6,366,053 B1 | 4/2002 | Belehradek | |
| 6,369,463 B1 | 4/2002 | Maiorano | |
| 6,375,430 B1 | 4/2002 | Eckert et al. | |
| 6,443,715 B1 | 9/2002 | Mayleben et al. | |
| 6,481,973 B1 | 11/2002 | Struthers | |
| 6,503,063 B1 | 1/2003 | Brunsell | |
| 6,527,518 B2 | 3/2003 | Ostrowski | |
| 6,595,051 B1 | 7/2003 | Chandler | |
| 6,632,072 B2 * | 10/2003 | Lipscomb | F04D 15/0218 417/12 |
| 6,638,023 B2 | 10/2003 | Scott | |
| 6,676,382 B2 | 1/2004 | Leighton et al. | |
| 6,789,024 B1 | 9/2004 | Kochan et al. | |
| 6,847,130 B1 | 1/2005 | Belehradek et al. | |
| 6,854,479 B2 | 2/2005 | Harwood | |
| 6,867,383 B1 | 3/2005 | Currier | |
| 6,998,807 B2 | 2/2006 | Phillips et al. | |
| 6,998,977 B2 | 2/2006 | Gregori et al. | |
| 7,015,599 B2 | 3/2006 | Gull et al. | |
| 7,083,392 B2 | 8/2006 | Meza et al. | |
| 7,100,632 B2 | 9/2006 | Harwood | |
| 7,102,505 B2 | 9/2006 | Kates | |
| 7,264,449 B1 | 9/2007 | Harned et al. | |
| 7,307,538 B2 | 12/2007 | Kochan | |
| 7,309,216 B1 | 12/2007 | Spadola et al. | |
| 7,339,126 B1 | 3/2008 | Niedermeyer | |
| 7,388,348 B2 | 6/2008 | Mattichak | |
| 7,429,842 B2 | 9/2008 | Schulman et al. | |
| 7,458,782 B1 | 12/2008 | Spadola et al. | |
| 7,459,886 B1 | 12/2008 | Potanin et al. | |
| 7,525,280 B2 | 4/2009 | Fagan et al. | |
| 7,528,579 B2 | 5/2009 | Pacholok et al. | |
| 7,612,529 B2 | 11/2009 | Kochan | |
| 7,700,887 B2 | 4/2010 | Niedermeyer | |
| 7,746,063 B2 | 6/2010 | Sabini et al. | |
| 7,755,318 B1 | 7/2010 | Panosh | |
| 7,788,877 B2 | 9/2010 | Andras | |
| 7,795,824 B2 | 9/2010 | Shen et al. | |
| 7,808,211 B2 | 10/2010 | Pacholok et al. | |
| 7,857,600 B2 | 12/2010 | Koehl | |
| 8,032,256 B1 | 10/2011 | Wolf et al. | |
| 8,049,464 B2 | 11/2011 | Muntermann | |
| 8,098,048 B2 | 1/2012 | Hoff | |
| 8,134,336 B2 | 3/2012 | Michalske et al. | |
| 8,316,152 B2 | 11/2012 | Geltner et al. | |
| 8,380,355 B2 | 2/2013 | Mayleben et al. | |
| 8,405,346 B2 | 3/2013 | Trigiani | |
| 8,405,361 B2 | 3/2013 | Richards et al. | |
| 8,547,065 B2 | 10/2013 | Trigiani | |
| 8,579,600 B2 | 11/2013 | Vijayakumar | |
| 2002/0000789 A1 | 1/2002 | Haba | |
| 2005/0156568 A1 | 7/2005 | Yueh | |
| 2005/0248310 A1 | 11/2005 | Fagan et al. | |
| 2005/0281679 A1 | 12/2005 | Niedermeyer | |
| 2006/0078435 A1 | 4/2006 | Burza | |
| 2006/0078444 A1 | 4/2006 | Sacher | |
| 2006/0093492 A1 | 5/2006 | Janesky | |
| 2006/0226997 A1 | 10/2006 | Kochan | |
| 2006/0269426 A1 | 11/2006 | Llewellyn | |
| 2007/0080660 A1 | 4/2007 | Fagan et al. | |
| 2007/0188129 A1 | 8/2007 | Kochan | |
| 2007/0258827 A1 | 11/2007 | Gierke | |
| 2008/0031751 A1 | 2/2008 | Littwin et al. | |
| 2008/0031752 A1 | 2/2008 | Littwin et al. | |
| 2008/0229819 A1 | 9/2008 | Mayleben et al. | |
| 2008/0298978 A1 | 12/2008 | Schulman et al. | |
| 2009/0208345 A1 | 8/2009 | Moore et al. | |
| 2009/0269217 A1 | 10/2009 | Vijayakumar | |
| 2010/0154534 A1 | 6/2010 | Hampton | |
| 2010/0166570 A1 | 7/2010 | Hampton | |
| 2010/0197364 A1 | 8/2010 | Lee | |
| 2010/0303654 A1 | 12/2010 | Petersen et al. | |
| 2011/0036164 A1 | 2/2011 | Burdi | |
| 2011/0077875 A1 | 3/2011 | Tran et al. | |
| 2011/0084650 A1 | 4/2011 | Kaiser et al. | |
| 2011/0110794 A1 | 5/2011 | Mayleben et al. | |
| 2011/0311370 A1 * | 12/2011 | Sloss | F04B 47/02 417/1 |

OTHER PUBLICATIONS

Glentronics Home Pages, dated 2007. 2 pages.

(56) References Cited

OTHER PUBLICATIONS

Goulds Pumps SPBB Battery Back-Up Pump product information, dated 2008. 1 pages.
Goulds Pumps SPBB/SPBB2 Battery Backup Sump Pumps, dated 2007. 2 pages.
ITT Red Jacket Water Products Installation, Operation and Parts Manual, dated 2009. 8 pages.
Liberty Pumps PC-Series Brochure, dated 2010. 2 pages.
"Lift Station Level Control" by Joe Evans PhD, www.pumped101.com, dated Sep. 2007. 5 pages.
The Basement Watchdog Computer Controlled AC-D/C Sump Pump System Instruction Manual, dated 2010. 17 pages.
The Basement Watchdog AC-D/C Battery Backup Sump Pump System Instruction Manual and Safety Warnings, dated 2010. 20 pages.
Pentair Water Ace Pump Catalog, dated 2007, 44 pages.
ITT Red Jacket Water Products RJBB/RJBB2 Battery Backup Sump Pumps; May 2007, 2 pages.

* cited by examiner

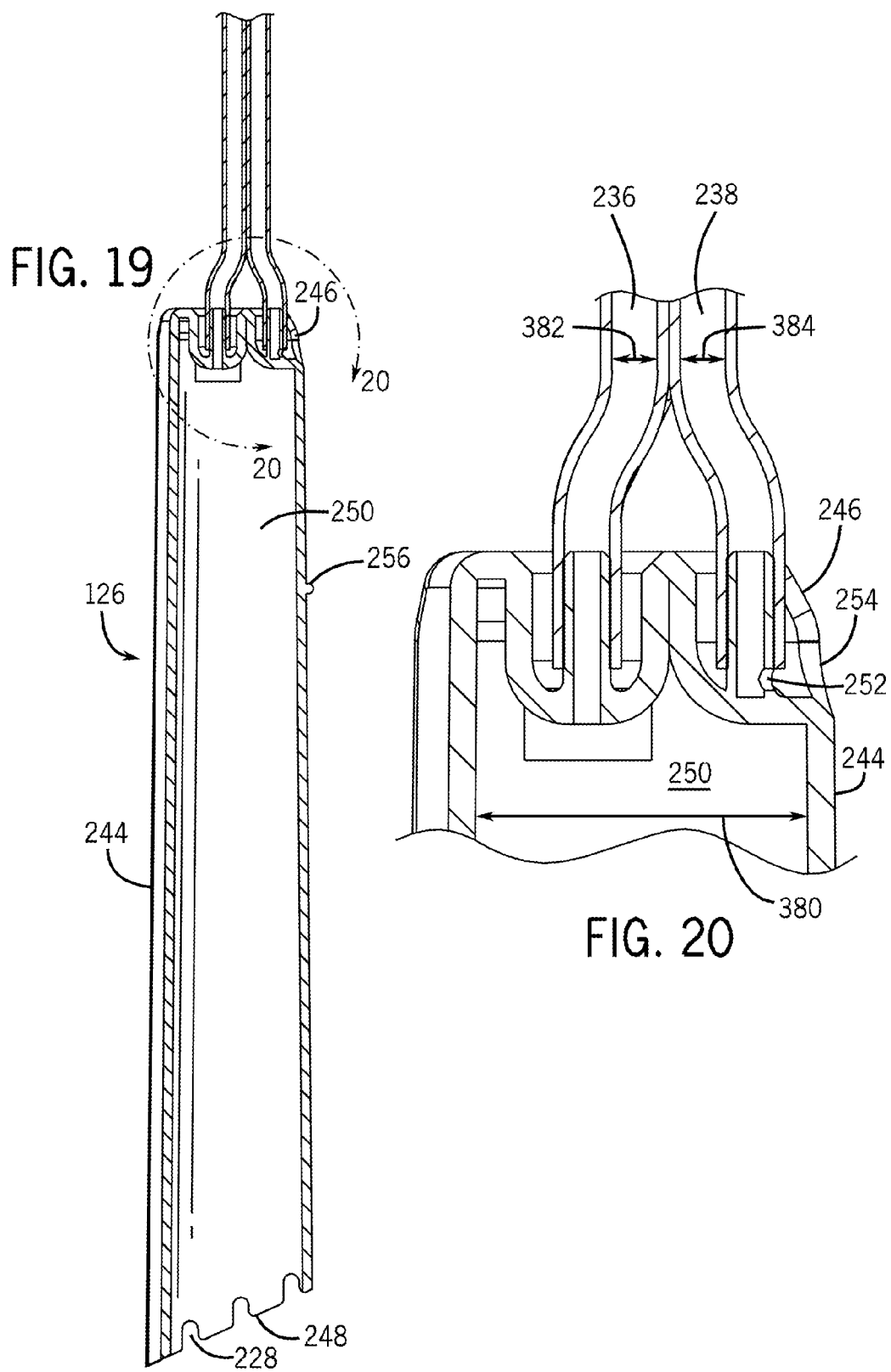

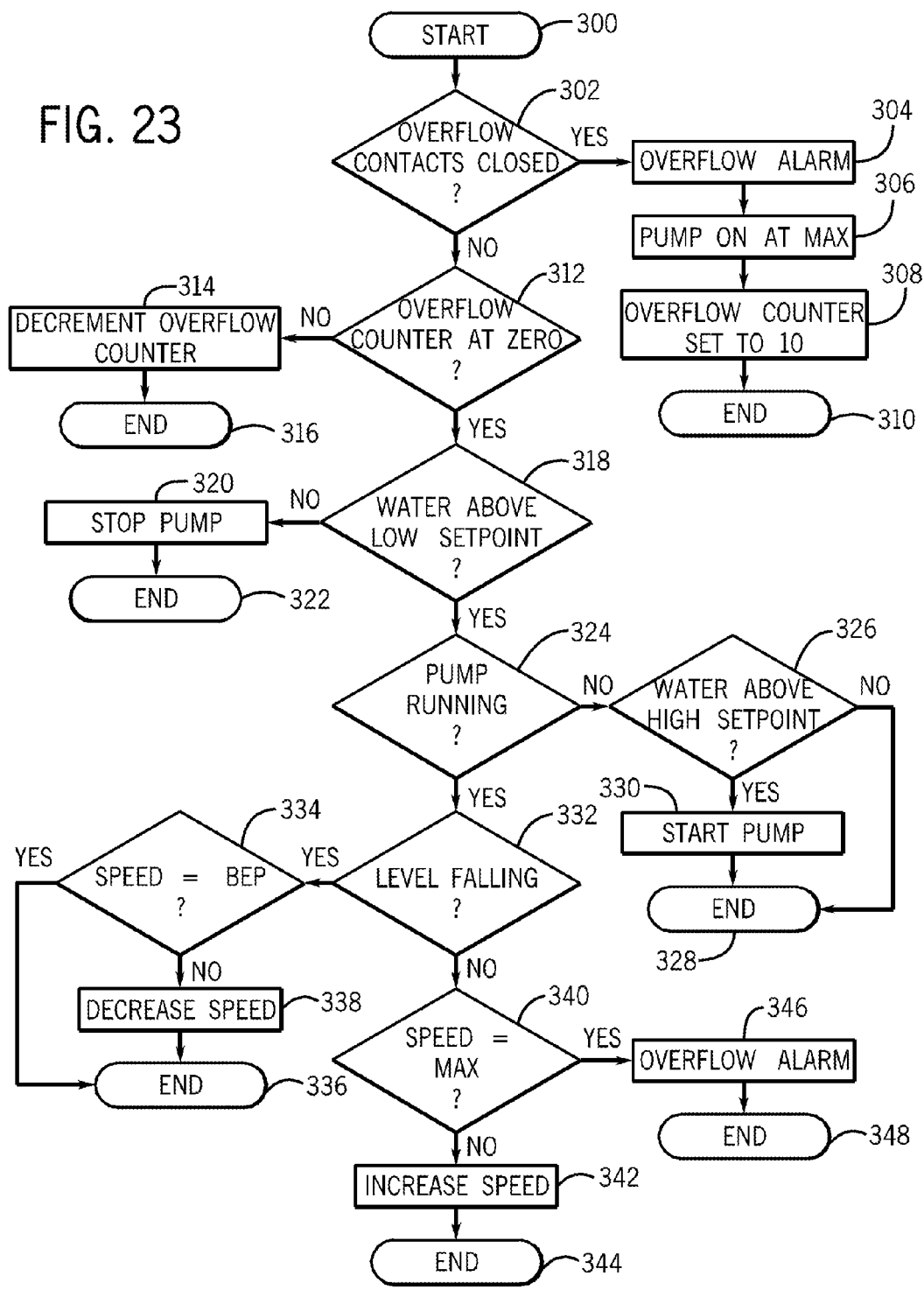

SUMP PUMP REMOTE MONITORING SYSTEMS AND METHODS

CROSS-REFERENCE TO RELATED APPLICATIONS

This application is a divisional of co-pending U.S. patent application Ser. No. 13/660,779 filed on Oct. 25, 2012 and titled "Sump Pump Remote Monitoring Systems and Methods," the entire contents of which are incorporated herein by reference.

BACKGROUND

Residential homes and other buildings with basements often have one or more built-in crocks or sump pits, which are holes designed to collect water that has accumulated around the home's foundation. A sump pump is typically installed in the sump pit to remove any accumulated water. Such sump pumps combine an electric motor with a fluid pump and are usually powered through the home's 120 VAC electrical system. Since power outages can occur for many known reasons, including as a result of heavy storms, when sump pumps are needed the most, homes can also be equipped with a secondary, battery-operated, backup sump pump. The backup sump pump is typically powered by a conventional 12 VDC battery, such as a lead-acid marine or deep cycle battery. The backup battery is often connected to a trickle-charge battery charger in order to ensure the battery is charged when it is needed.

FIG. 1 illustrates a common installation of a primary sump pump 50 in a sump pit 52. When installing the primary sump pump 50, a check valve 54 is often installed downstream from a discharge 56 of the primary sump pump 50 to prevent flow of the water back into the sump pit 52. In the configuration of FIG. 1, a backup sump pump would be installed so that the discharge of the backup sump pump would connect into a pipe 58 between the discharge 56 and the upper surface of the sump pit 52. In such a configuration, if the backup sump pump were to turn on, the natural flow of water from the discharge 56 of the backup sump pump would be down through the primary sump pump 50 and back into the sump pit 52 (i.e., the path of least resistance). Therefore, in conventional backup sump pump installations, an installer must cut the pipe 58, pull the pipe 58 and the primary sump pump 50 out of the sump pit 52, and make sure there is a check valve at the discharge 56. If there is no check valve at the discharge 56 (e.g., because the check valve 54 was installed outside of the pit), the installer must obtain another check valve, remove the pipe 58 from the primary sump pump 50, install the new check valve at the discharge 56, re-cut the pipe 58 to a suitable length, and glue/attach the pipe 58 to the new check valve.

Typically, the peak demand for a sump pump is during a rain storm, hurricane, flooding or other severe weather. These weather conditions are also the most likely to cause loss of electrical power. When a home owner is away from home during a storm or loss of power, the ability to remotely monitor the operation of the backup sump pump provides a reassurance that the backup sump pump is operating to remove the storm water from the sump pit. Yet, neither primary sump pumps nor backup sump pumps are available that allow a user to conveniently remotely monitor the operation of the sump pump.

SUMMARY

Some embodiments of the invention provide systems and methods for sump pump remote monitoring.

In other embodiments of the invention, a backup sump pump remote monitoring system can include control circuitry integrated into a portable housing, with the backup sump pump connected to the control circuitry. The control circuitry can be powered by a line power and when the line power is not available, the control circuitry can be powered by a battery power. The control circuitry can be connected to a control panel, and the control circuitry can include a pressure transducer, the pressure transducer to measure a pressure in a fluid level sensor, and based on the measured pressure, the control circuitry to adjust the speed of the backup sump pump. A wireless controller can be connected to the control circuitry, the wireless controller for wirelessly receiving monitoring instructions and wirelessly transmitting backup sump pump status data, with the control circuitry providing an indication of the backup sump pump status data to the control panel.

In other embodiments of the invention, a fluid level sensor remote monitoring system can include an inverted cup with a sealed top and an open bottom, the inverted cup defining an inner air space and having an inner pressure. An inner pressure tube can extend from the inner air space and through the sealed top, the inner pressure tube being connected to a pressure line connector. An ambient pressure tube can include an open end, the open end being positioned near the sealed top, with the ambient pressure tube also connected to the pressure line connector. A control box can monitor the inner pressure from the inner pressure tube and the ambient pressure from the ambient pressure tube, the pressure line connector connectable to the control box. The control box can include a wireless controller, a pressure transducer, and a switch, the wireless controller for wirelessly receiving monitoring instructions and wirelessly transmitting status data, the pressure transducer to measure the inner pressure and the ambient pressure, and based upon the measured inner pressure and the measured ambient pressure, to activate the switch.

In some embodiments of the invention, a method for remotely monitoring a fluid pump can include initiating a remote monitoring procedure using a remote device; receiving a request to initiate the remote monitoring procedure at a wireless controller, the wireless controller a component of the fluid pump; providing a pulse width modulated signal to the fluid pump to run the pump at a predetermined speed; measuring a pulse width of the pulse width modulated signal provided to the fluid pump; and providing a status indication for the fluid pump based on the measured pulse width.

DESCRIPTION OF THE DRAWINGS

The embodiments will hereafter be described with reference to the accompanying drawings, wherein like reference numerals denote like elements, and:

FIG. 19 is a side view in section of the pressure sensor of FIG. 18;

FIG. 20 is a side view in section of a top portion of the pressure sensor of FIG. 19;

FIG. 23 is a flow chart illustrating a method of operating a BBU system according to one embodiment of the invention.

DETAILED DESCRIPTION

Figure 1:
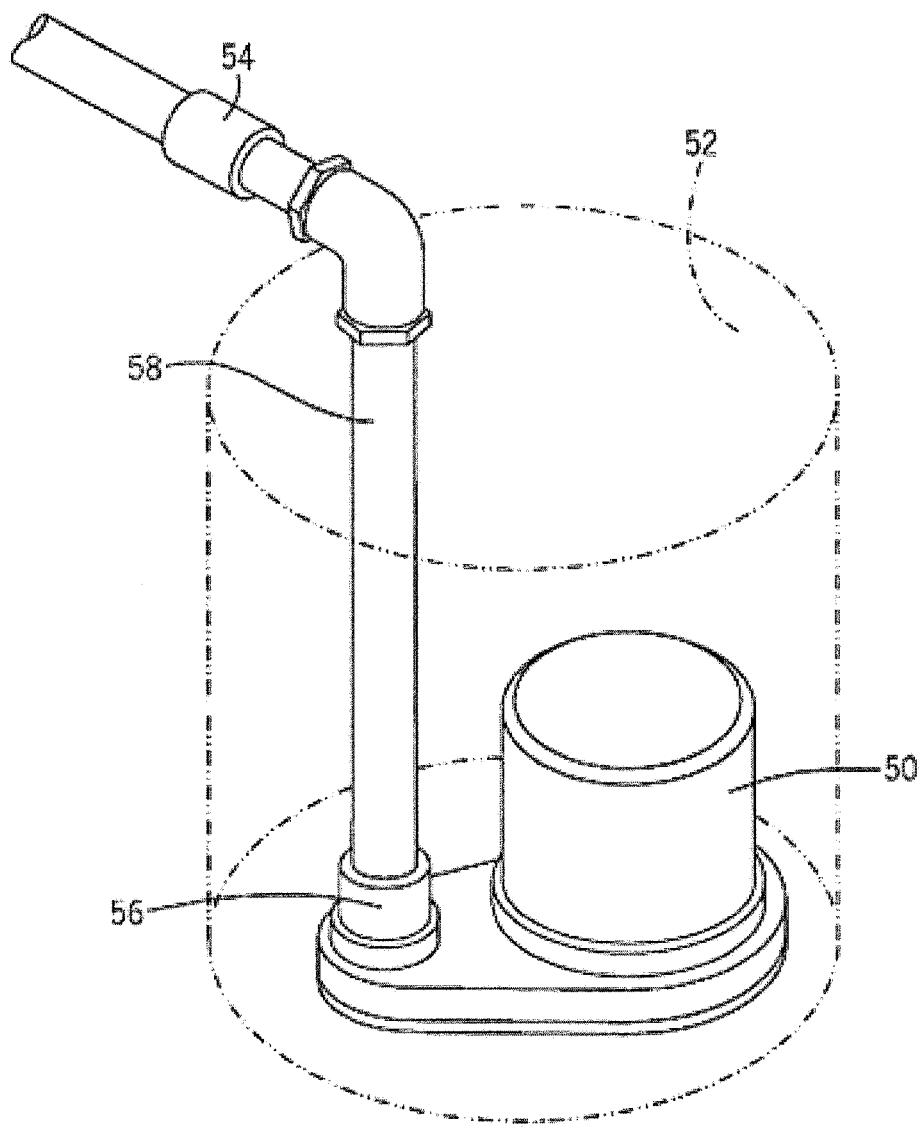
FIG. 1 is a perspective view of a traditional or primary sump pump installation.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

The BBU system can provide a backup sump pump system that can operate during a power outage. Typically, the peak demand for a sump pump is during a rain storm, hurricane, flooding or other severe weather. These weather conditions are also the most likely to cause loss of electrical power. An additional purpose of the BBU system is if for any reason the main (e.g., 120 VAC) primary sump pump fails, the backup sump pump can operate in place of the primary sump pump.

The BBU system can include one or more batteries fully charged and standing by for use on demand. When the sump pit water level rises above a predetermined height, the BBU system can turn on the backup sump pump and lower the water level in the pit. In some embodiments, the BBU system can continue to run or cycle on and off until there is no longer a demand from high water.

During the BBU system's time of operation, a warning light can be displayed and/or an alarm can sound alerting the user that the primary sump pump is not functioning. When AC power is available, the BBU system can be recharging and/or maintaining the battery. In some embodiments, an indication and/or an alarm can be activated if there is an issue with the battery or battery charger.

In the event of a primary sump pump failure and/or a power failure, if the sump pit fills to a preset level, determined by a device capable of providing an indication of a change in a fluid height, such as a float switch or pressure sensor, for example, the backup sump pump can be activated to lower the water level to a predetermined level. The backup sump pump can continue to run or cycle on and off until either the battery is drained or the primary sump pump is replaced, or the AC power is restored, allowing the primary sump pump to run again. In some embodiments, the backup sump pump can be capable of pumping up to 3000 GPH at 10 feet of head, for example. Other backup sump pump capacities are also considered for a variety of applications.

Similarly, in the event the primary sump pump fails to keep up with the water inflow to the sump pit so the sump pit fills to a predetermined high level, the backup sump pump can be activated to help lower the water level to a predetermined low level. The backup sump pump can continue to run or cycle on and off until either the battery is drained or the primary sump pump is able to keep up with the water inflow.

When everything is back to normal and AC power is restored, the BBU system can proceed to recharge the battery in preparation for the next occurrence. The BBU system can also allow operation of the backup sump pump while the battery charger is charging the battery.

The BBU system can be configured in a variety of arrangements to meet the needs of a variety of applications. FIGS. 2-5 illustrate in block diagram form one embodiment of a BBU system 100. The BBU system 100 can operate as a backup sump pump system.

Figure 2:
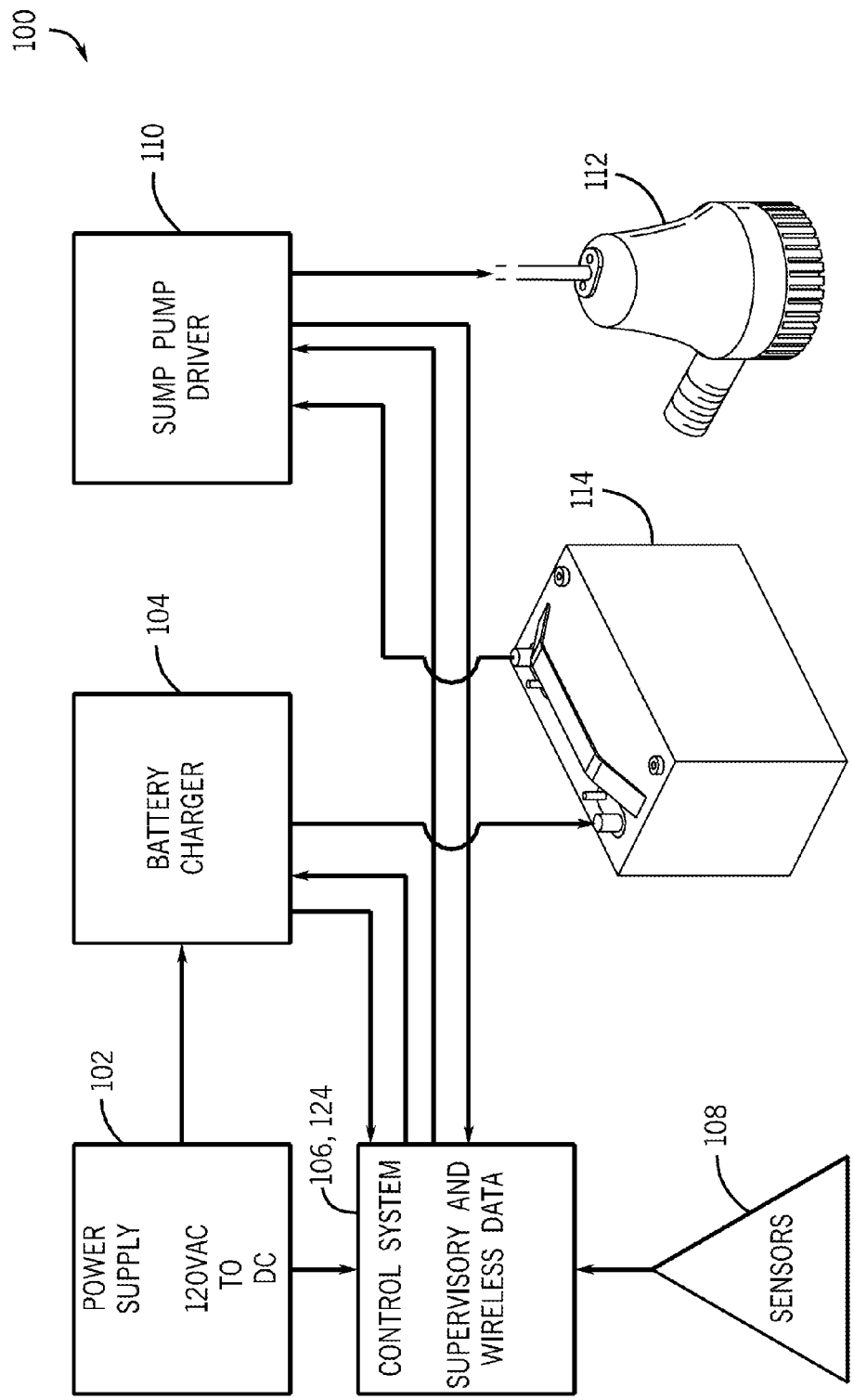
FIG. 2 is a block diagram of a Battery Backup Unit ("BBU") system according to one embodiment of the invention.

As shown in FIG. 2, the BBU system 100 can include a power supply 102, a battery charger 104, a control system 106, sensor(s) 108, sump pump driver(s) 110, a backup sump pump 112, and an optional battery(s) 114. Each of these components work together to perform the functions of the BBU system 100, and each will be described in greater detail below.

The power supply 102 of the BBU system 100 can function to provide sufficient voltage and current to permit some or all operational functions of the BBU system 100 to occur without unnecessary limitations. The power supply 102 can be protected against common problems such as overcurrent. In one embodiment, the power supply can serve to convert incoming wall power (e.g., 120 VAC) to an internal supply voltage of approximately 18 VDC, at between about 2.0 A to about 2.5 A, for supplying power for internal functions. It is to be appreciated that other known voltages and currents can also be used depending on the application and available incoming wall power and hardware. This internal supply voltage can be used to supply power to the battery charger 104 and to supply power for the control system 106. In some embodiments, the power supply 102 may not be required to provide enough power to run the backup sump pump 112 without discharging the battery 114, with power to the control system 106 taking priority over the battery charger 104.

In one embodiments the power supply 102 can serve to convert incoming wall power (e.g., 120 VAC) to an internal supply voltage of about 30 VDC, at about 20 A, supplying power for internal functions. The power supply 102 can be used to power only the battery charger 104 in some embodiments, as the control system 106 and other items can be powered from supply voltages generated by an inverter 116 (as discussed below).

The battery charger 104 can function to charge a battery 114 in a supervised and controlled manner, including not overcharging the battery. In some embodiments, the battery charger 104 can charge the battery 114 in both a fast mode and a float charge mode, and can automatically switch between the charging modes. In some embodiments, the battery charger 104 can be configured to charge two or more parallel batteries at the same time. The battery charger 104 can be configured to protect itself from common problems, such as a reversed or disconnected battery.

The battery charger 104 can sense and adjust charge currents and voltages depending on the type of battery (e.g., Flooded Lead Acid, Sealed Lead Acid, GEL or AGM). Once charged, the battery charger 104 can monitor and maintain a charge to assure standby power. In some embodiments, the charger 104 can power off for energy savings until the battery 114 needs additional charge.

Figure 3:
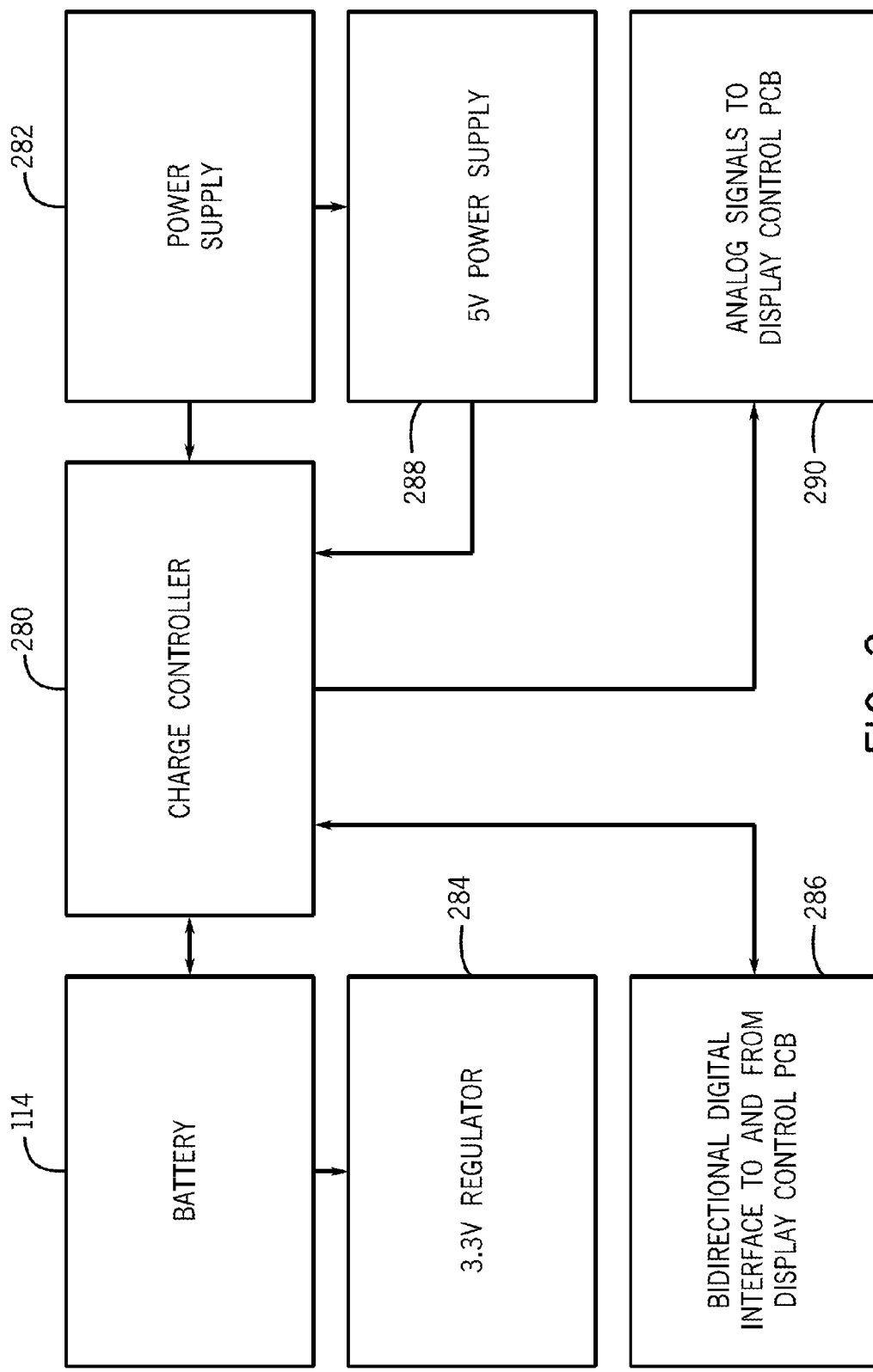
FIGS. 3-5 are block diagrams of components of the BBU system of FIG. 2.

FIG. 3 illustrates the interrelation of components affecting the battery charger 104. Charge controller 280 can be connected to the battery 114 and a power supply 282. In some embodiments, the power supply 282 can be an internal power supply, and in other embodiments, the power supply 282 can be an external power supply. The battery 114 can be connected to a voltage regulator 284. In one embodiment, the power supply 282 can connect to a 5 VDC power supply 288, the 5 VDC power supply providing a DC voltage to the charge controller 280. The charge controller 280 can be connected to interface 286 for bidirectional communication. The charge controller 280 can also provide signals to a display controller 290. In one embodiment, the charge controller 280 can be a Texas Instruments BQ2031 integrated circuit.

Figure 4:
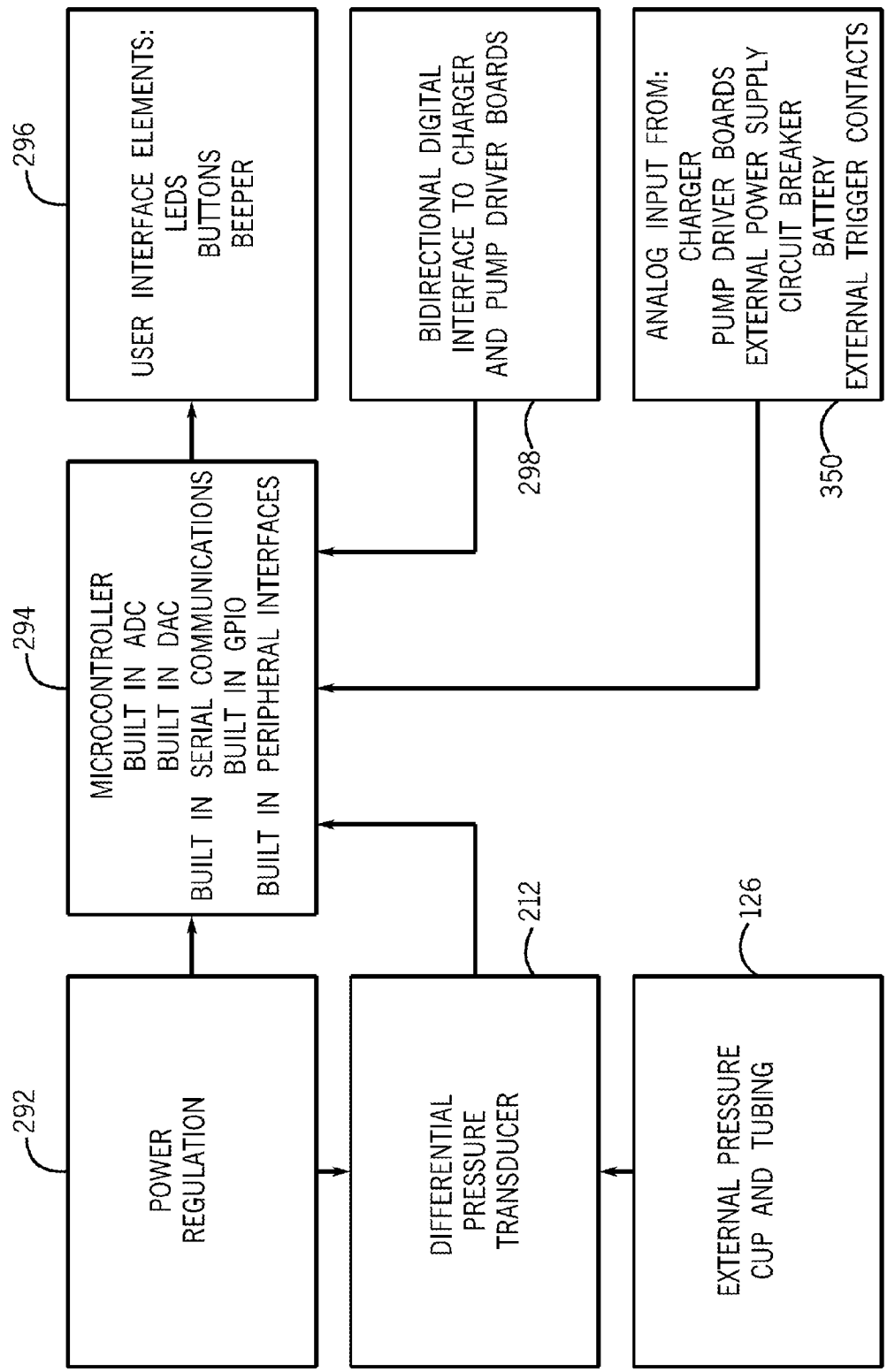

FIG. 4 illustrates the interrelation of components affecting the control system 106. A microcontroller 294 can receive signals from a power regulator 292. In some embodiments, the microcontroller 294 can be a Silicon Laboratories C8051F360 or C8051F369 microcontroller. In some embodiments, the microcontroller 294 can perform the functions of the charge controller 280. The power regulator 292 can regulate power to a pressure transducer 212, which receives pressure data from a pressure sensor 126. The microcontroller 294 can also receive digital input from interface 298 and analog input 350 from a variety of BBU 100 components. In some embodiments, the microcontroller can provide a control function for user interface elements 296.

The control system 106 of the BBU system 100 can control BBU system 100 functions. The control system 106 can manage the operation of the system, diagnose the health and/or status of specific system functions, and can provide indications to a user of the status. The control system 106 can implement logic to properly handle situations including, but not limited to, no AC power, no AC power with water level rising, no AC power with water level rising above backup sensor, pump system self-test, pressure sensor health test, battery charger health test, control system self-test, and battery health test.

Figure 12:
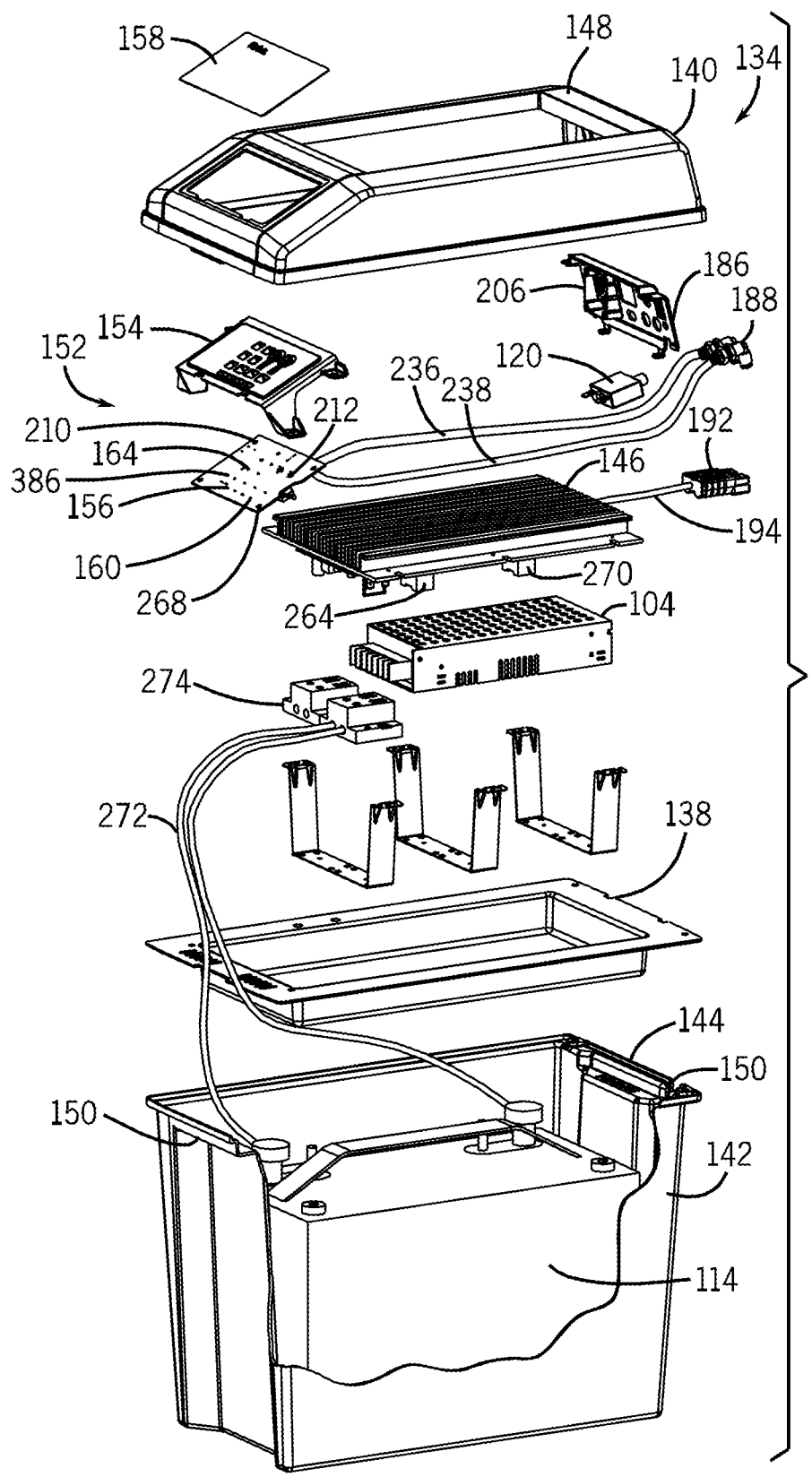
FIG. 12 is an exploded perspective view of the BBU system of FIG. 10.

The control system 106 can perform a variety of functions. For example, the control system can monitor and activate the necessary lights and alarms. The control system 106 can also perform automatic self test sequences to verify that system components, such as the battery charger 104, inverter 116, battery(s) 114 and backup sump pump 112, are functional. The control system 106 can also include a resettable circuit breaker 120 (as shown in FIG. 12) for backup sump pump over load protection. A fuse or circuit breaker can also be included for battery and/or battery cable overload protection.

The control system 106 can also perform duplex operation when two sump pumps are attached to the BBU system 100. Duplex operation can be disabled when only one sump pump is coupled to the BBU system. In some embodiments, multiple power outlets can be provided, such that an extra auxiliary outlet can be available when using the BBU system as a duplex system.

Figure 5:
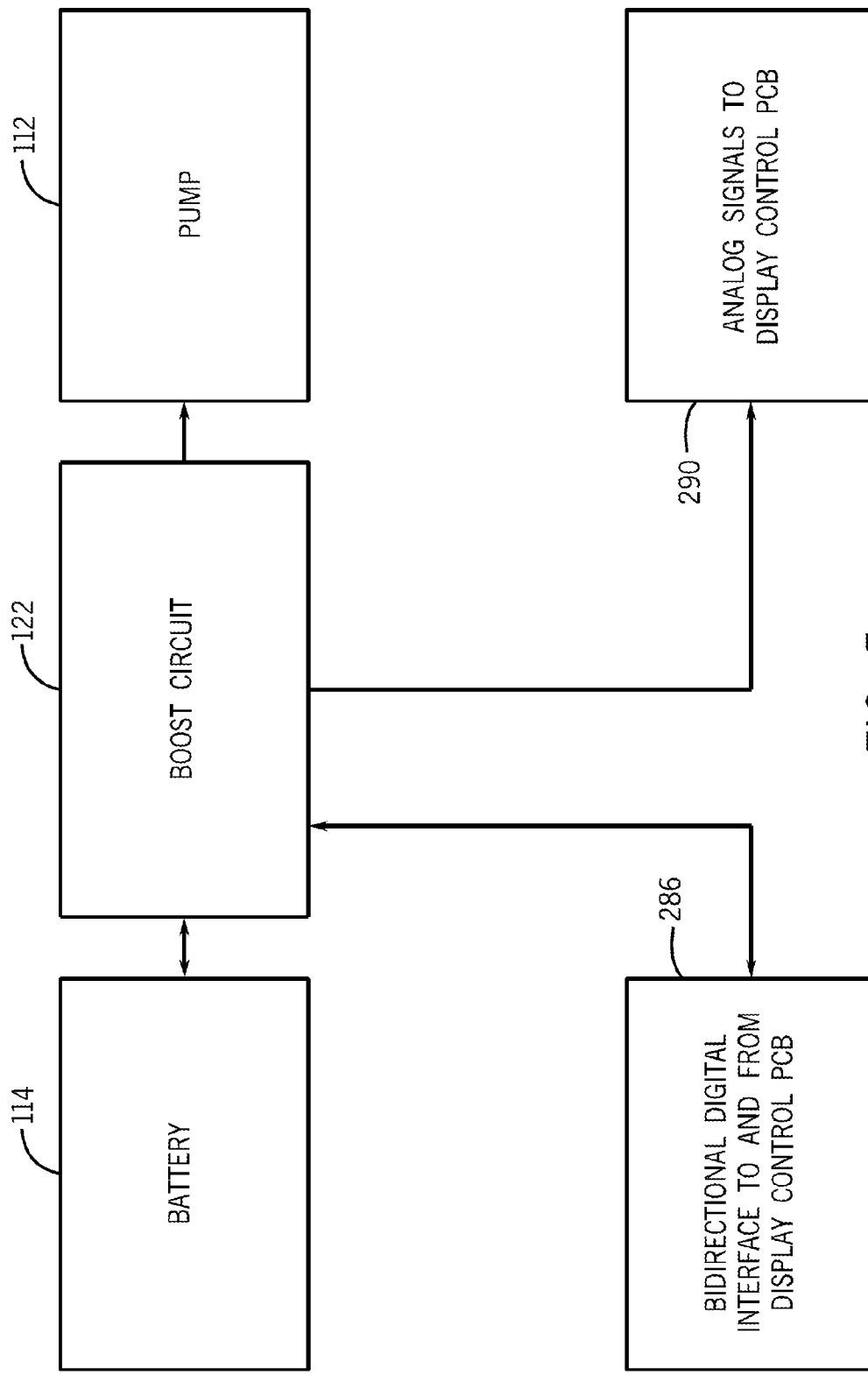

As shown in FIG. 5, the control system 106 can also include a variable boost circuit 122 that can be a step-up switchmode voltage regulator. The variable boost circuit 122 can be controlled by a Linear Technologies LTC3787 integrated circuit. In some embodiments, the microcontroller 294 can perform the functions of the variable boost circuit 122. The control system 106 can use the variable boost circuit 122 along with the ability to sense whether the water level is rising, steady or falling to operate the backup sump pump 112 more efficiently. When using a 12 VDC battery 114, for example, the boost circuit 122 can provide approximately 12 VDC to the backup sump pump 112 while at the same time the battery 114 voltage can drop down to a predetermined lower voltage, such as approximately 6 VDC. The boost circuit 122 can be connected to interface 286 for bidirectional communication. The boost circuit 122 can also provide signals to the display controller 290.

Figure 6:
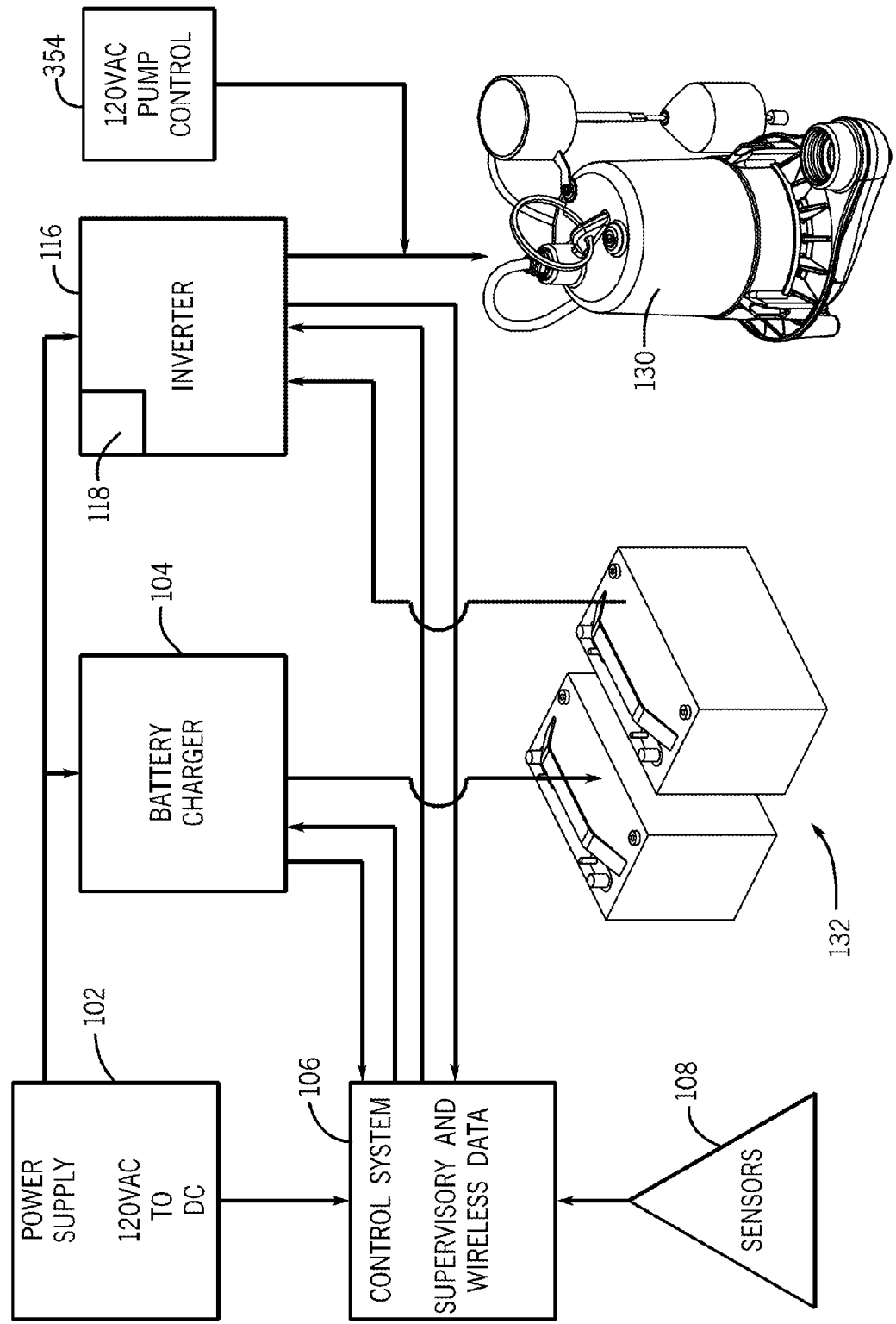
FIG. 6 is a block diagram of an alternative BBU system according to one embodiment of the invention.

In some embodiments, the control system 106 can also include a wireless controller 124 for transmitting and receiving data wirelessly for remote monitoring functionality, as shown in FIGS. 2 and 6. For example, the wireless controller 124 may transmit data via the internet to an external website for customer interaction. The wireless controller 124 can include an RF transmitter such as an antenna for receiving signals and transmitting data to a remote device.

Figure 18:
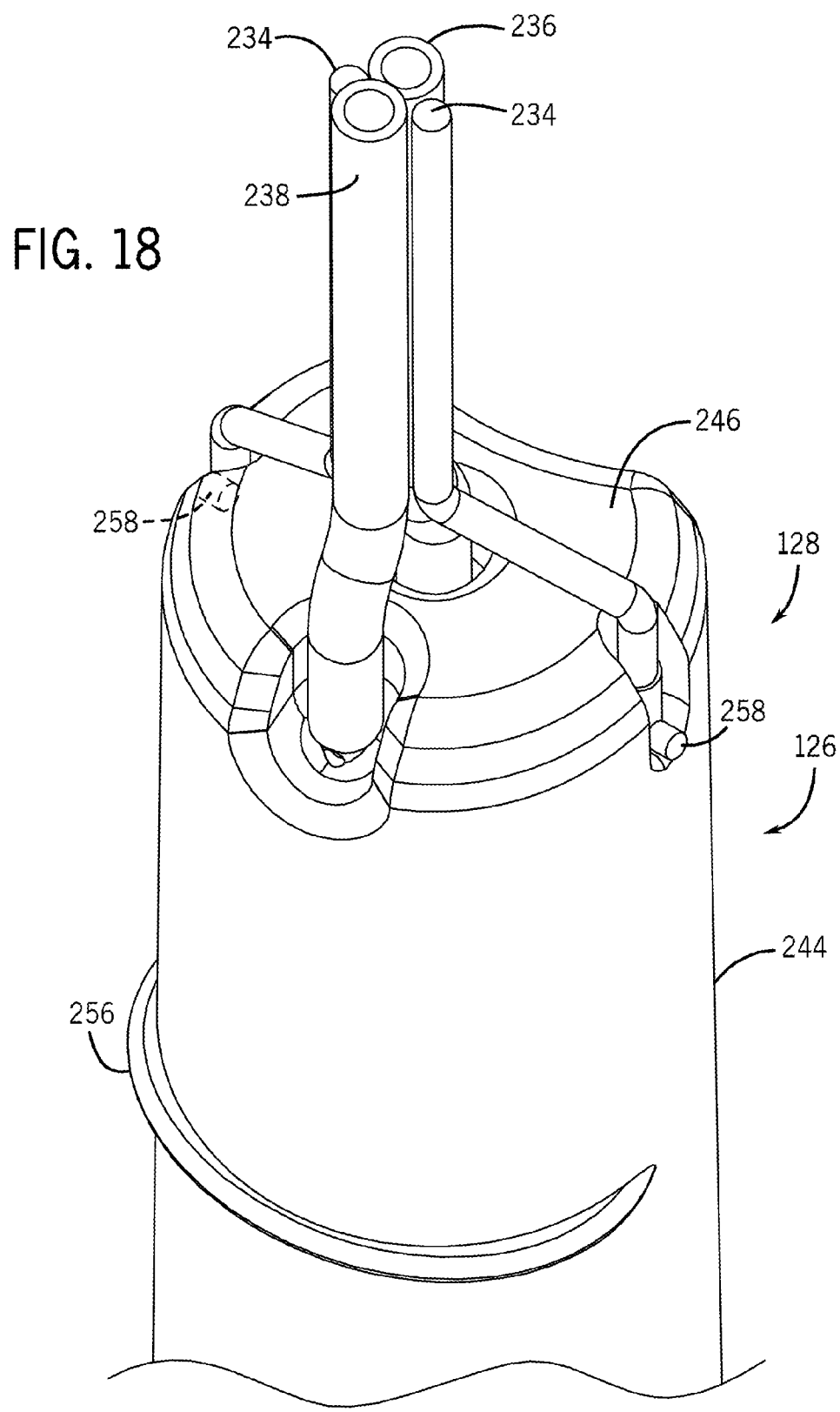
FIG. 18 is a perspective view of a top portion of a pressure sensor usable with a BBU system according to one embodiment of the invention.
Figure 21:
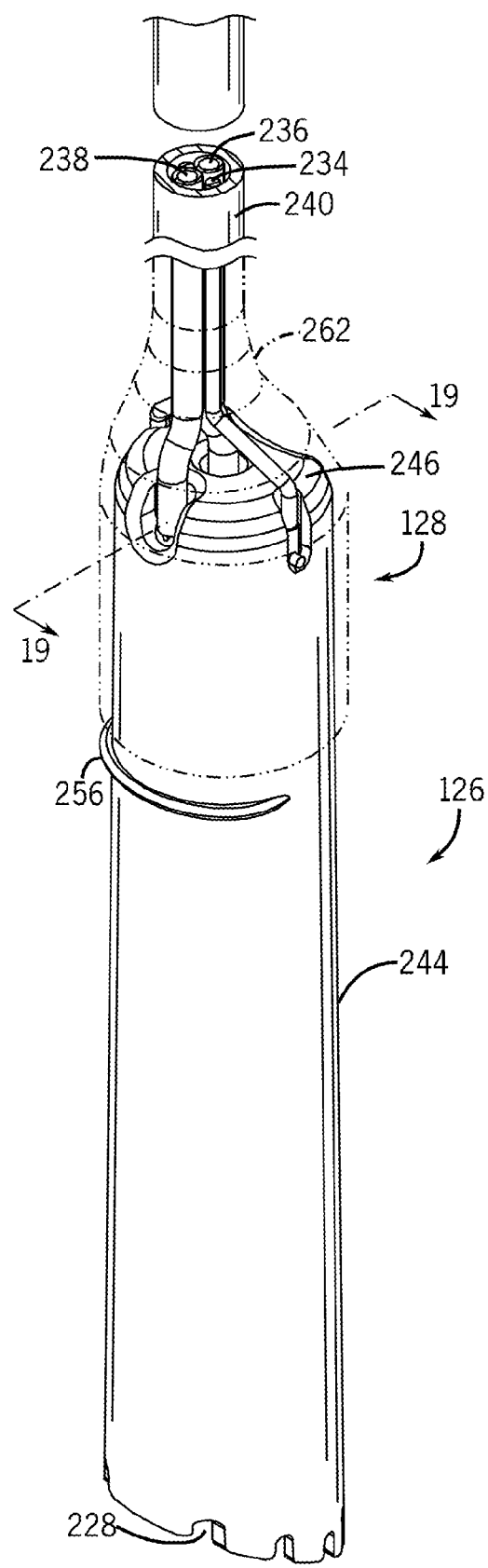
FIG. 21 is a perspective view of the pressure sensor of FIG. 18.

As shown in FIG. 2, one or more sensors 108 can be included with the BBU system 100, and can be capable of detecting and or indicating a change in a water level. In some embodiments, the sensors 108 can detect water level both discretely and with quantitative output. In some embodiments, the sensors 108 can include the pressure sensor 126 (as shown in FIGS. 4, 8, 10, 11 and 18-21) and a contact sensor 128, as shown in FIGS. 18 and 21, for example. The BBU system 100 can operate with sensor(s) included with the BBU system, and/or any sensor or switch included with the existing sump pump.

As shown in FIG. 2, the sump pump driver 110 can be capable of driving the backup sump pump 112 at a single speed, and in some embodiments, at least two distinct and selectable voltages. Each selectable voltage can be tailored for maximum efficiency, and maximum flow rate, of a particular sump pump. The pump driver 110 can be configured to protect itself from common problems, such as a failed backup sump pump 112 or overcurrent condition, for example. The pump driver 110 can interface with and be controlled by the control system 106 to control the speed of the backup sump pump 112.

Figure 14:
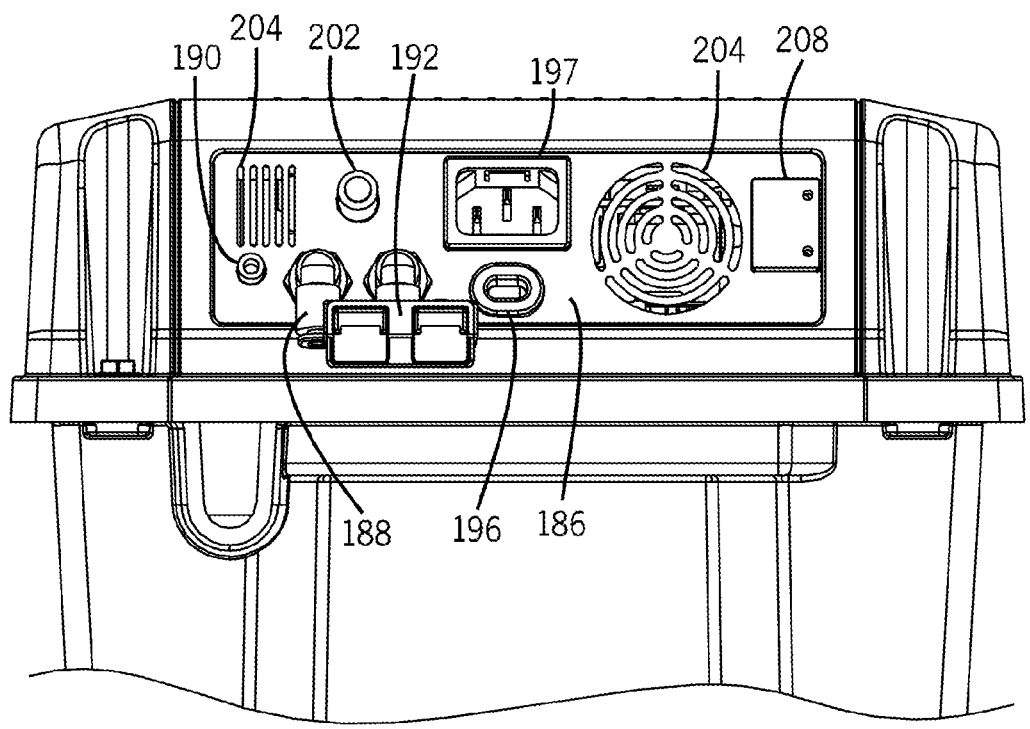
FIGS. 14 and 15 are rear views of alternative embodiments of a back panel on the BBU system of FIG. 10.

As shown in FIGS. 6-9, in some embodiments, the BBU system 100 can include a DC to AC inverter 116 and use a standard 120 VAC sump pump(s) 130 with pass through AC power until loss of power. The pass through power allows the pump 130 to operate normally when 120 VAC is available. The BBU system 100 can then draw from a 12 VDC battery, for example, through the inverter 116 to operate the sump pump 130 with pump control 354 until power is restored. The inverter 116 can interface with the control system 106 to both provide information to the control system 106 and receive commands from the control system 106. In some embodiments, the battery charger 104 can be connected to the inverter 116 and an AC outlet 118, so that the battery charger 104 can also serve as an AC power source. The AC outlet 118 can be located, for example, on a back panel 186, as shown in FIG. 14 and discussed below.

As shown in FIG. 6, the inverter 116 can be capable of driving any sump pump load that operates at a predetermined amperage of continuous running current draw (e.g., about 15 A or less). The inverter 116 can be able to supply a momentary startup surge current of 150 percent of running rating (e.g., 21 A) for up to five seconds. The inverter 116 can also serve to convert 24 VDC from a battery bank 132 to 120 VAC, in order to operate sump pumps operating at 120 VAC. The inverter 116 can generate 120 VAC within a predetermined amount of precision, and the output voltage of the inverter 116 can be limited to certain variations from no load to full load. The inverter 116 can also provide for overload protection in case of a sump pump failure.

Figure 7:
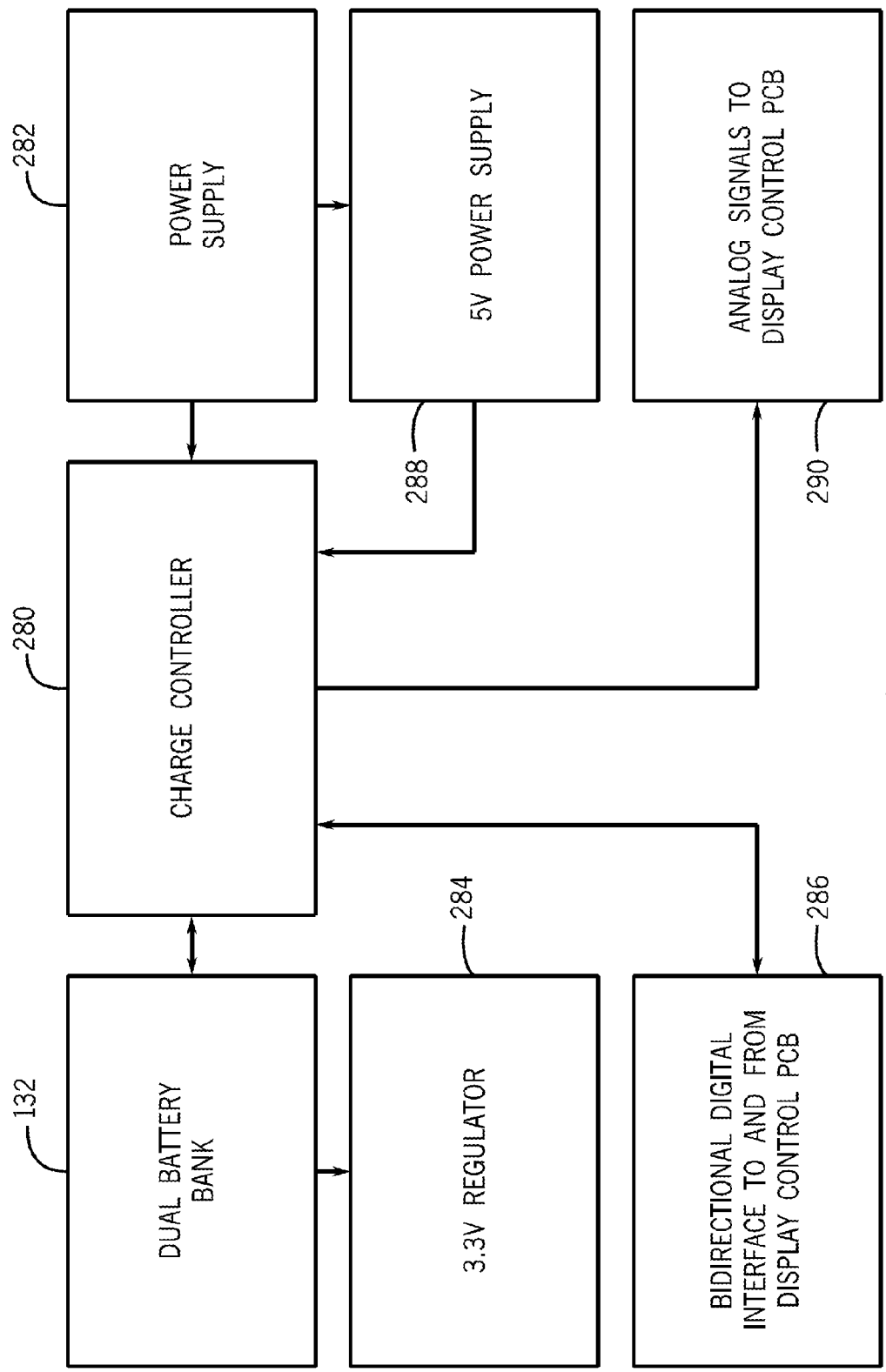
FIGS. 7-9 are block diagrams of components of the BBU system of FIG. 6.

FIG. 7 is similar to FIG. 3 and illustrates the interrelation of components affecting the battery charger 104 when battery bank 132 is used. Charge controller 280 can be connected to the battery 114 and the power supply 282. Supporting circuitry of the charge controller 280 can be modified to configure it for the 24 VDC battery bank 132. As previously described, in some embodiments, the microcontroller 294 can perform the functions of the charge controller 280. The battery bank 132 can be connected to the voltage regulator 284. In one embodiment, the power supply 282 can connect to the 5 VDC power supply 288, the 5 VDC power supply providing a DC voltage to the charge controller 280. The charge controller 280 can be connected to interface 286 for bidirectional communication. The charge controller can also provide signals to a display controller 290.

Figure 8:
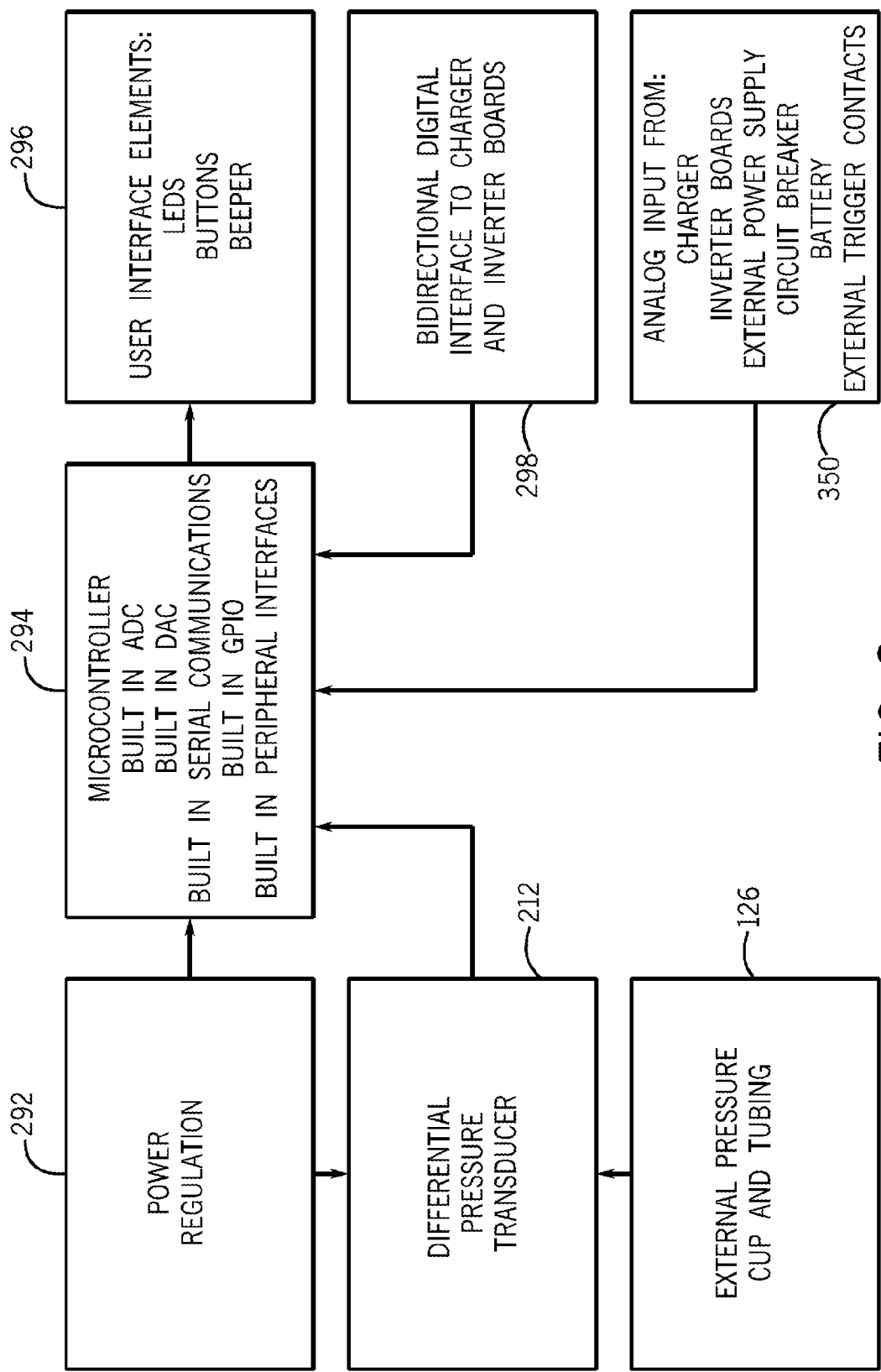

FIG. 8 is similar to FIG. 4 and illustrates the interrelation of components affecting the control system 106 when the inverter 116 is included. The microcontroller 294 can receive signals from the power regulator 292. The power regulator 292 can regulate power to the pressure transducer 212, which receives pressure data from the pressure sensor 126. The microcontroller 294 can also receive digital input from interface 298 and analog input 350 from a variety of BBU 100 components. In some embodiments, the microcontroller can provide a control function for user interface elements 296. With the 120 VAC sump pump(s) 130, pump speed may not be variably controlled, yet the control system 106 can still determine how fast the water level is rising or falling. In some embodiments, if the water level is rising quickly, the 120 VAC sump pump(s) 130 can be turned on early, possibly at a slightly lower level to get a head-start. If the water level is rising slowly, the control system 106 can wait until the water level reaches a higher predetermined starting point.

Figure 9:
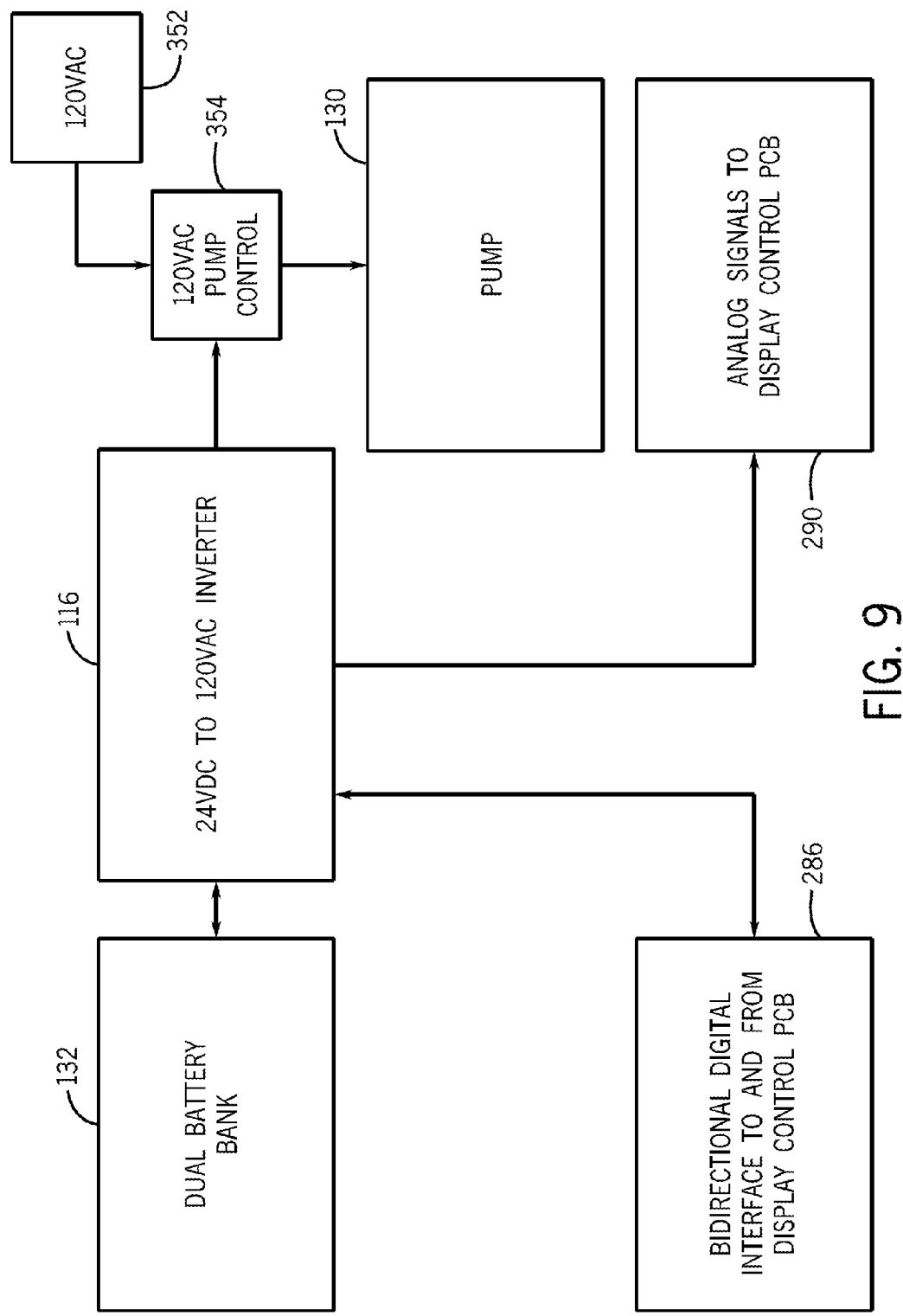

FIG. 9 is similar to FIG. 5 and illustrates the interrelation of the inverter 116 to components of the control system 106. When using the battery bank 132, the inverter 116 can convert approximately 24 VDC to approximately 120 VAC, and provide the 120 VAC to the pump control 354. The pump control 354 can provide 120 VAC wall power 352 or 120 VAC inverter 116 power to the backup sump pump 130, while at the same time the battery bank 132 voltage can drop down to a predetermined lower voltage, such as approximately 6 VDC. The inverter 116 can be connected to interface 286 for bidirectional communication. The inverter 116 can also provide signals to the display controller 290.

In some embodiments, the inverter 116 can be controlled by a Silicon Laboratories C8051F360 or C8051F369 microcontroller 294. The inverter 116 can include six identical isolated flyback voltage step-up circuits, three producing a positive 160-180 VDC and three producing a negative 160-180 VDC. These can be followed by a chopper stage to turn these high DC voltages into 120 VAC at 60 Hz with a good approximation of a sine wave. Pulse-width modulators built into the microcontroller 294 provide the drive for both the flyback and chopper stages. The microcontroller's 294 built-in analog-to-digital converters can monitor the high-voltage DC, the inverter output and AC line power.

Figure 10:
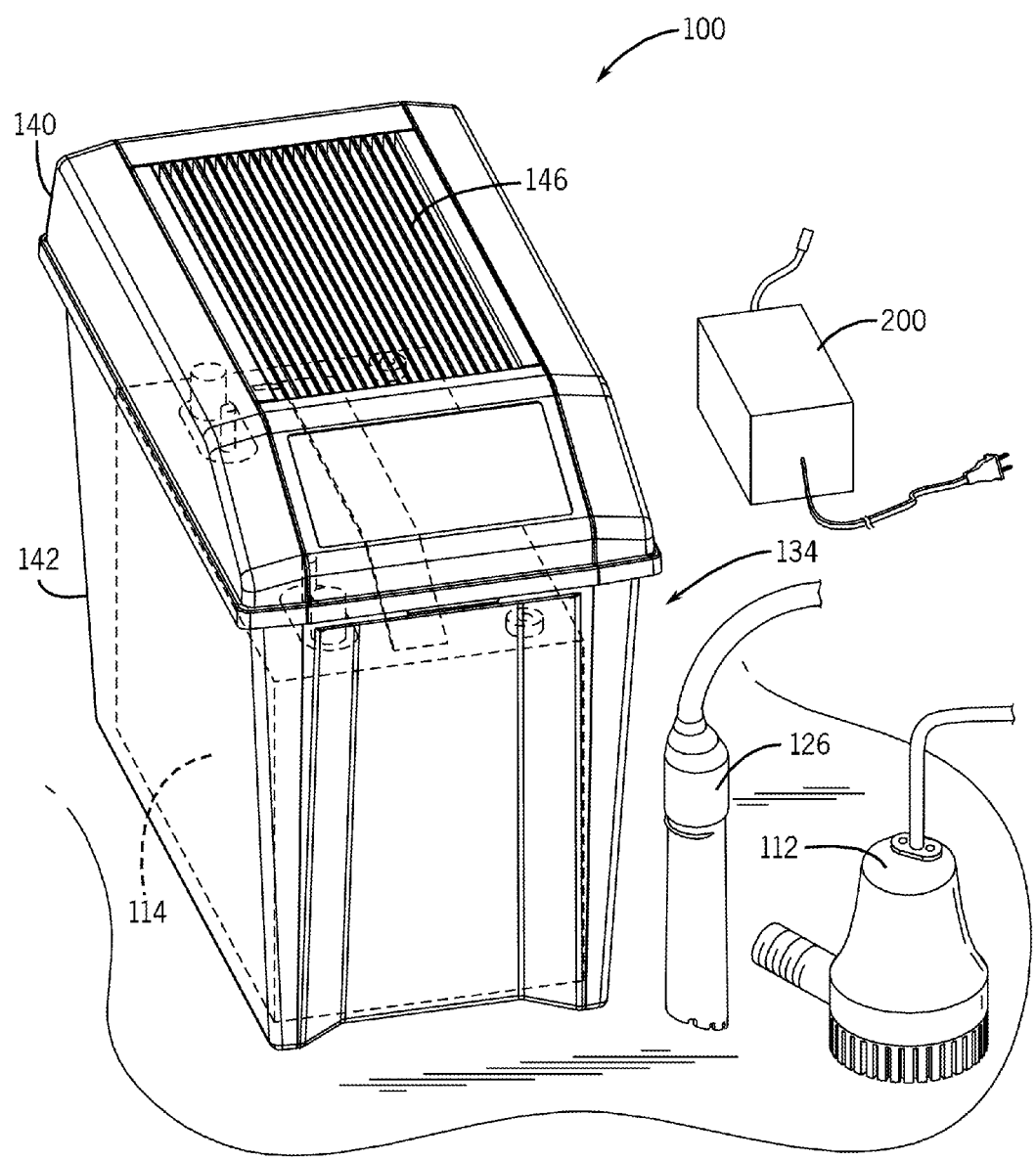
FIG. 10 is a perspective view of a BBU system according to one embodiment of the invention.
Figure 11:
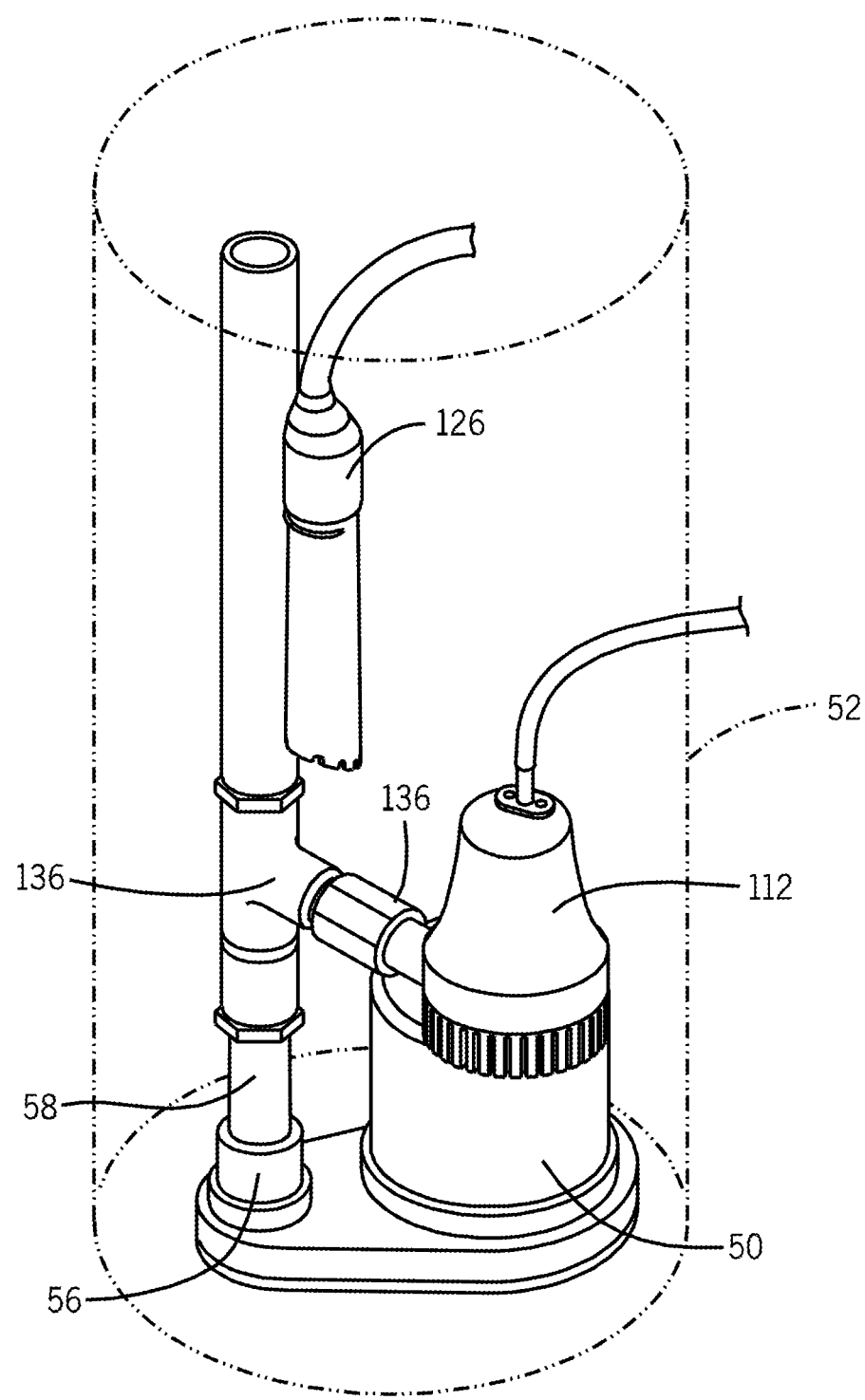
FIG. 11 is a perspective view of a backup sump pump installed on top of a primary sump pump.

FIG. 10 illustrates a BBU system 100 according to another embodiment of the invention. The BBU 100 can include a backup sump pump 112 and a pressure sensor 126 to be positioned in a sump pit 52, a portable housing 134, and plumbing components 136 (as shown in FIG. 11). The backup sump pump 112 can be a DC operated backup sump pump powered by a DC battery 114. In some embodiments, the battery 114 can be a 12 VDC battery and can be placed and/or stored inside of the portable housing 134. In some embodiments, the DC battery power may be inverted to provide an AC backup power to run an AC operated backup sump pump 130.

The battery 114 can be connected to the battery charger 104 via cables 272 (as shown in FIG. 12) and can be stored inside the portable housing 134. When the battery charger 104 is integrated into the portable housing 134, the cables 272 can be accessed from inside the portable housing 134, as shown, and may couple to a terminal block 274. The battery 114 can be a deep-cycle battery, such as a size 24 M marine deep cycle battery (e.g., Flotec model FP12V24VCC), a size 27 M marine deep cycle battery (e.g., Flotec model FP12V27DCC), or a 12 VDC car battery. In some embodiments, the battery 114 can also be a gel cell battery or an absorbed glass mat (AGM) battery. Some batteries can be provided with quick-connect cables that snap into the terminal block 274. This can eliminate a user touching live battery terminals. The various terminals can be configured so that each device can only be connected to the correct terminals in the correct polarity.

As shown in FIG. 11, while conventional primary sump pumps 50 are powered using a home's AC electrical system, the battery-operated backup sump pump 112 and the pressure sensor 126 can be installed in a sump pit 52 of a home. The battery-operated backup sump pump 112 can be powered using the battery 114 to backup the primary sump pump 50 in cases of a power outage or other problem that prevents normal operation of the primary sump pump 50. The backup sump pump 112 can be installed in a variety of configurations, including on top of the primary sump pump 50 (i.e., a "top installation"), as shown in FIG. 11, or beside the primary sump pump 50 at the bottom of the sump pit 52 (i.e., a "side installation"). The location of the backup sump pump 112 can be based on the size of the sump pit 52, among other factors. Both types of installations may involve cutting the discharge pipe 58 downstream from the discharge 56 of the primary sump pump 50 and integrating the plumbing components 136.

Referring to FIG. 12, the portable housing 134 can be constructed of plastic and can include two halves, a top housing 140 and a lower housing 142. A spacer 138 can be used to separate the top housing 140 and the lower housing 142. In some embodiments, the housing 134 may include a hinged clam-shell design. The top housing 140 and the lower housing 142 can include one or more latches 144 to secure the portable housing 134 when closed. Cooling can be provided by a heat sink 146, for example, and can be integrated into the housing 134 or can be coupled to the housing 134. The heat sink 146 can be positioned at or near a top portion 148 of the top housing 140, for example, or the heat sink 146 can be positioned on or in the lower housing 142, or can be integrated with a portion of the lower housing 142. A separate additional housing (not shown) can be included for additional batteries. In some embodiments, the portable housing 134 can include one or more handles or grips 150 to allow a user to conveniently carry the housing.

In some embodiments, one or both of the top housing 140 and the lower housing 142 can include control circuitry 152 of the control system 106. The control circuitry 152 can include a control panel 154, and can be coupled to the battery charger 104. The battery charger 104 can be a 12 VDC, 2.0 A battery charger, for example. In other embodiments, the battery charger can be a 5.5 A or 10.0 A charger, for example. In still other embodiments, the battery charger 104 can be external to the housing 134, and may be a separate device that can be connected to the BBU system 100. The BBU system 100 and/or components of the BBU system 100 can be designed into the portable housing 134 so the BBU system 100 can meet industry standards for dust, water, RF and EMC, for example, as well as shock and vibration. These standards can include FCC-Part 15-class B (CISP 22), IEC 60335-2-29, IEC 61000-6-3, IEC 61000-6-1, IEC 60068-2-27 and IEC 60068-2-6.

Figure 13:
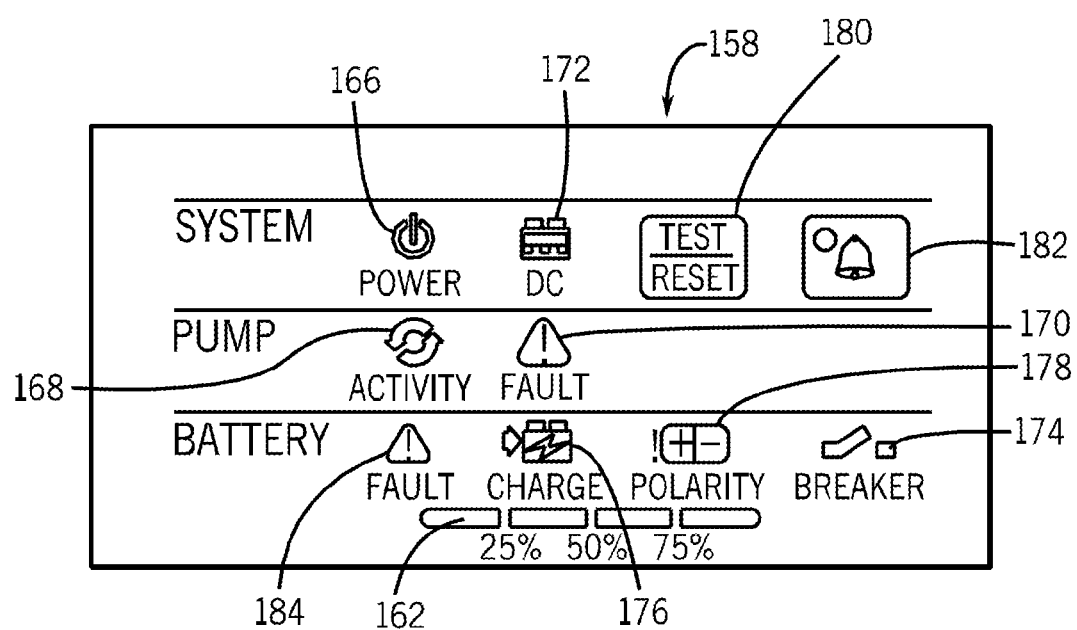
FIG. 13 is a view of an overlay usable with a BBU system according to one embodiment of the invention.

As shown in FIGS. 12-13, the control panel 154 can include additional control circuitry 156 and an overlay 158, so that the overlay 158 can include colors, symbols, text, and/or graphics, for example, that may be illuminated or otherwise highlighted by various indicator devices, such as LEDs 160, to display function and/or status information to a user through the overlay 158. For example, the additional control circuitry 156 can include a "DC" LED, an "Alarm" LED, an "Activity" LED, a "Fault" LED for the backup sump pump 112, a "Fault" LED for the battery 114, a "Charge" LED, a Polarity LED, and a "Breaker" LED. In addition, in some embodiments, the overlay 158 can include a readout display 162 as an additional indicator of system parameters, as shown in FIG. 13. In some embodiments the readout display 162 can be a charge indicator that can display the state of charge of the battery 114. This can be a bar graph or bar gage as shown in FIG. 13, a seven segment display, or other visual embodiments.

As also shown in FIGS. 12 and 13, the overlay 158 can include various indicators positioned over buttons 164 (e.g., manual press down switches) on the additional control circuitry 156 for the user to provide input and/or to control the BBU system 100. The buttons can include, for example, a "Power" button, a "Test/Reset" button, and a "Silence Alarm" button. The control of the indicator LEDs 160 and the buttons 164, as well as the control of the battery charger 104, can be executed by hardware and/or software stored within the control circuitry 152. In some embodiments, the additional control circuitry 156 includes the hardware and/or software. Such hardware and/or software can also detect when a power outage occurs and can automatically turn on and off the backup sump pump 112.

In some embodiments, the indicators described above can operate as follows:

Green power light 166 on—indicates DC power is available. Green Power light 166 off—indicates system is not ready—no DC power available. No alarm. If all lights are off—system is non-operational.

Yellow pump activity light 168 on—indicates the 12 V inverter has been activated (loss of AC power). Alarm can sound. Alarm can be temporarily silenced. Alarm and light may be manually reset when condition is remedied.

Red pump fault light 170 on—indicates pump failure. Light and alarm cannot be reset until situation is remedied. Reset pump breaker if tripped.

Green DC light 172 on—indicates no battery problem. Possible battery problems include, no battery, old/dead battery, low charge, broken cables, loose connections or corrosion in the terminals.

Red breaker light 174 on—indicates the breaker has been tripped and no DC power is available. Light and alarm cannot be reset until situation is remedied.

Green charge status light(s) 162—indicates a percentage of charge in the battery or estimated run time remaining.

Green charge light 176 on—battery is charging.

Red battery polarity light 178 on—battery is connected backwards. Light and alarm cannot be reset until situation is remedied.

Green test/reset light 180 on—system is going through automatic or manually initiated test sequence.

Alarm light 182 on—indicates an alarm condition.

Battery fault light 184 on—indicates system detected a battery fault condition.

As shown in FIG. 14, in some embodiments, one or both of the top housing 140 and the lower housing 142 can include a back panel 186. The back panel 186 can provide sockets and/or connectors to couple the BBU system 100 to external devices and/or a source of power. In some embodiments, one or more pressure line connectors 188 can be accessible on the back panel 186. The pressure line connectors 188 can connect to the pressure sensor 126 (as shown in FIGS. 18-21) used to detect a water level in the sump pit 50. Similarly, a high water alarm connector 190 may be accessible for connection with the optional high water level contact sensor 128 (as shown in FIGS. 18 and 21).

As further shown in FIG. 14, in some embodiments, the back panel 186 can include a DC voltage output socket 192. The output socket 192 can provide DC output power to the backup sump pump 112. In some embodiments, such as when the battery charger 104 is provided within the housing 134, the output socket 192 can be in the form of a quick connector socket. As shown in FIG. 12, the output socket 192 can extend from the housing 134 using a jumper 194 extending through an aperture 196 in the back panel 186 (as shown in FIG. 14), or through other access holes in one or both of the top housing 140 or the lower housing 142. The output socket 192 can enable the battery charger 104 to serve as a pass-through DC power supply.

Figure 15:
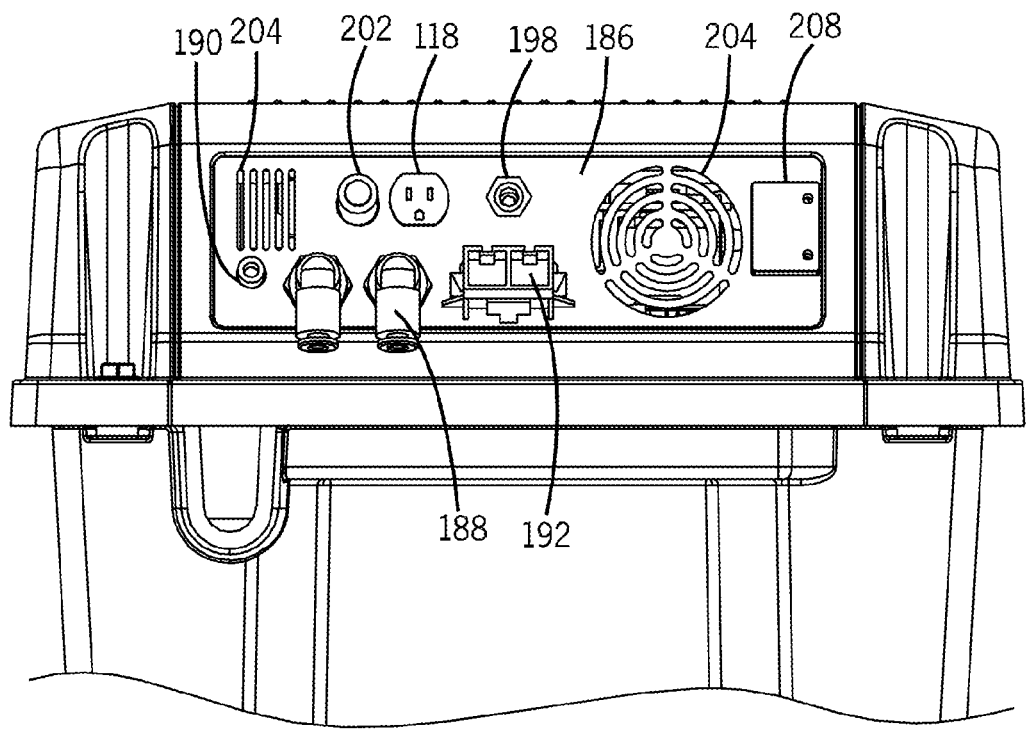

As shown in FIGS. 14-15, in some embodiments, the back panel 186 can also include an AC voltage input connector 197 and/or a DC voltage input connector 198. In some embodiments with the internal power supply 104, the AC voltage input connector 197 can electrically connect to an external AC power supply, such as an AC outlet (e.g., a 120 VAC outlet typically capable of delivering about 15 A), using an extension cord, for example. The internal power supply 104 can then convert the 120 VAC input to a DC voltage (e.g., 18 VDC output) and provide the DC voltage to the control system 106. In some embodiments, where the power supply 104 is external to the housing 134, an external 120 VAC to 18 VDC adaptor 200 (or other common DC voltages) may be included (as shown in FIG. 10) that can connect to the DC input connector 198 on the back panel 186. The 18 VDC can then be supplied to the control system 106.

For protection from power spikes, a circuit breaker 120 (e.g., 20 A) can be included in the control circuitry 152 (as shown in FIG. 12), and the back panel 186 can include a circuit breaker reset button 202. The back panel 186 can also include ventilation slots 204 for air ventilation within the housing 134. In some embodiments, an internal fan 206 (as shown in FIG. 12) can be included to provide air movement. In some embodiments, low voltage accessory contacts 208 may also be provided, and can be accessible on the back panel 186.

Figure 16:
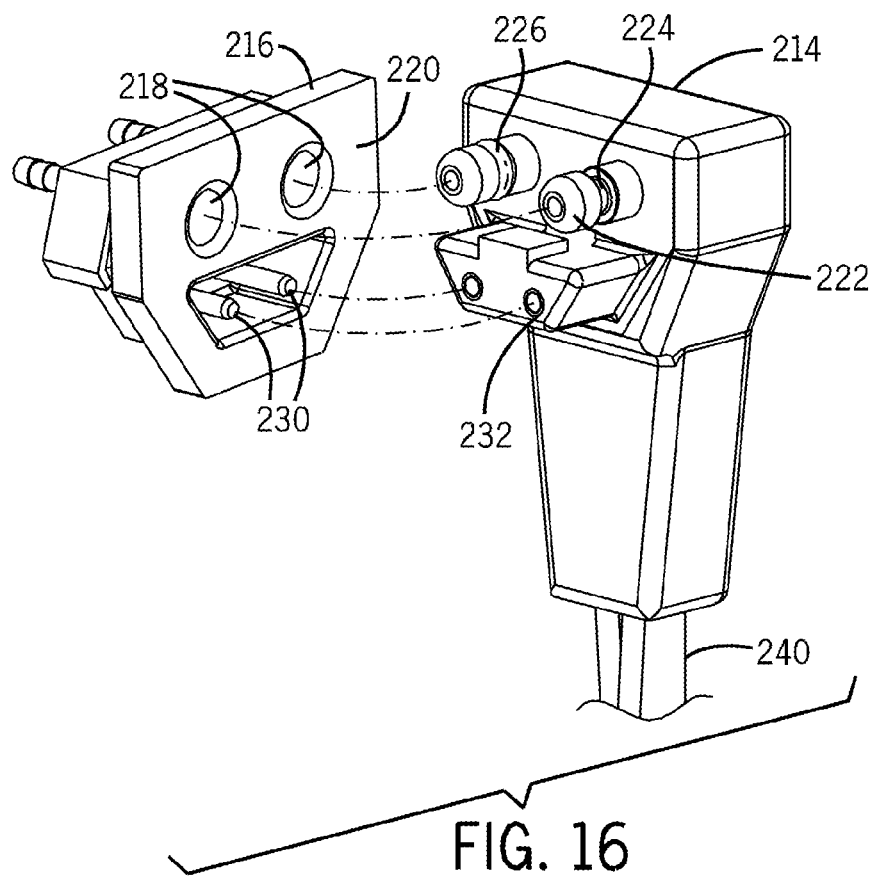
FIGS. 16 and 17 are perspective views of a plug and socket usable with a BBU system according to one embodiment of the invention.
Figure 17:
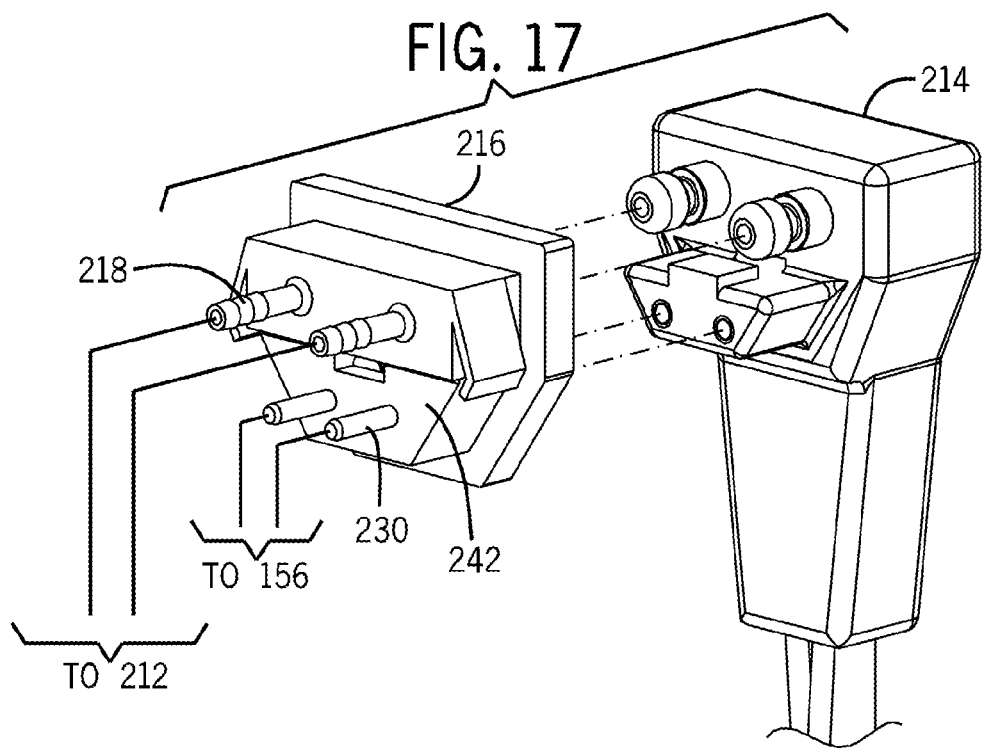

Referring to FIGS. 16 and 17, in some embodiments, the pressure sensor 126 can be coupled to the BBU system 100 using a plug 214 and a socket 216. In some embodiments (not shown), the socket 216 can be accessible on the back panel 186, and can include one or more pressure receivers 218 on an external side 220 of the socket 216 for connection to the pressure line connectors 222 on the plug 214. The pressure line connectors 222 can include a groove 224 for a seal, such as an O-ring 226 (only one O-ring is shown). The pressure receivers 218 can include O-rings in place of or in addition to the O-rings 226 on the pressure line connectors 222. The socket 216 can also include signal pins 230 that can couple to signal connectors 232 on the plug 214. Signal conductors 234 and an inner pressure tube 236 and an ambient pressure tube 238 can exit the plug 214 and extend in a bundle 240 until they all terminate on the pressure sensor 126, as shown in FIG. 18.

As shown in FIG. 17, the signal pins 230 can be accessible on an internal side 242 of the socket 216. The signal pins 230 can be electrically coupled to contacts 210 as part of the control circuitry 152, as shown in FIG. 12, where a signal from the contact sensor 128 (as shown in FIG. 18) can be monitored. Similarly, the inner pressure tube 236 and the ambient pressure tube 238 can extend from the internal side 242 of the socket 216 and can extend to the pressure transducer 212, which can also be part of the control circuitry 152. The pressure transducer 212 connected to the tubes 236, 238 can then measure the internal pressure change as the water level increases and/or decreases. This measurement can be used to trigger turning the backup sump pump 112 on and off and adjusting the speed of the backup sump pump 112.

As shown in FIGS. 18-21, the pressure sensor 126 can include an inverted pressure cup 244 with a sealed top 246 and an open bottom 248. In use, as a water level in the sump pit rises above the open bottom 248, the pressure cup 244 becomes a sealed pressure vessel with an inner air space 250 defining the pressure inside the pressure cup 244 as generally proportional to the depth of water inside the sump pit 52. The open bottom 248 can be angled, as shown, and can include one or more gaps 228 to help avoid possible plugging of the open bottom 248. The inner pressure tube 236 can extend from the inner air space 250 defined by the pressure cup 244 to the plug 214 or the socket 216, for example, and can provide the pressure from inside the pressure cup 244 to a measurement device, e.g., the pressure transducer 212. The ambient pressure tube 238 can terminate near the top 246 of the pressure cup 244, and can be in fluid communication with an air hole 252 accessible on an outside portion 254 of the pressure cup 244, for example, as shown in FIG. 20. The ambient pressure tube 238 can extend from the outside 254 of the pressure cup 244 to the plug 214 or socket 216, for example. The ambient pressure tube 238 can provide the ambient or surrounding pressure to the pressure transducer 212.

In some embodiments, an inner diameter 380 of the pressure cup 244 can be larger than an inner diameter 382 of the inner pressure tube 236 and/or an inner diameter 384 of the ambient pressure tube 238. For example, the diameter 380 of the pressure cup 244 can be 50 or 20 or 10 or 5 or 2 times larger than the diameter 382 of the inner pressure tube 236 and the diameter 384 of the ambient pressure tube 238. A larger diameter pressure cup 244 serves to minimize any effects of the volume, e.g., length, of the inner pressure tube 236 and/or the volume of the ambient pressure tube 238 on the accuracy of the pressure measurement from the pressure transducer 212.

The lower sensing threshold of the pressure sensor 126 is somewhat above the open bottom 248 of the pressure cup 244. In some embodiments, a timer 386 can be used to allow the backup sump pump 112 to run long enough to pump water to a level at least to or below the open bottom 248 of the pressure cup 244 before turning the pump off. If the open bottom 248 of the pressure cup 244 is not cleared, i.e., ambient air not allowed to enter the open bottom 248, over time a small amount of pressure can remain and may leak and/or there can be absorption of some air into the water. Eventually this can cause the water level to drop and can cause the system to become uncalibrated. The timer 386 can be used to keep the calibration intact by clearing the open bottom 248 of the pressure cup 244 to ambient air pressure with each or a predetermined number of backup sump pump cycles.

The signal pin conductors 234 can extend from the plug 214 or socket 216, and terminate at a pair of conductive contacts 258, as shown in FIG. 18. The conductive contacts 258 can serve as the contact sensor 128, so that the control circuitry 152 monitoring the contacts 258 can detect that the fluid level has reached the contacts 258 and react accordingly (e.g., activate alarm 182).

In some embodiments, as shown in FIG. 21, the pressure tubes 236, 238 and/or the signal pin conductors 234 can be partially or fully encased in the protective bundle 240. The protective bundle 240 can extend to an over mold 262 that can encase the pressure tubes 236, 238 and the conductors 234 and the top 246 of the pressure cup 244. The over mold 262 can serve to retain the pressure tubes and the conductors to the pressure cup 244, and can further provide strain relief. In other embodiments, the pressure tubes 236, 238 and the conductors 234 can be combined into a fitting that couples to the top of the pressure cup 244.

The pressure transducer 212 as shown in FIG. 12 can monitor the pressure change from the pressure sensor 126 and activate the BBU system 100 to turn the backup sump pump 112 on and off. In some embodiments, the pressure sensor 126 can be configured so that the backup sump pump 112 turns on with a predetermined water level rise (e.g., 1, 2, 4.5, or 10 inches), and turns off when the water level drops to the bottom 248 of the cup 244, so that the ambient pressure equals the inner cup pressure.

The pressure cup 244 can be attached to a wall of the sump pit 52, or to a PVC pipe 58 extending into the sump pit 52, for example, using screws or tie wraps (as shown in FIG. 11), and can include a non-slip exterior surface for interfacing with the wall or PVC pipe. As shown in FIG. 18, a rim or lip 256 can extend partially or completely around the pressure cup 244 to secure the pressure cup 244 when using a tie wrap, for example.

The pressure transducer 212 can measure the rate of water entering the sump pit 52 and then provide an output to a voltage regulator 264 (as shown in FIG. 12) that can turn the backup sump pump 112 at a predetermined speed at or a slightly higher speed than what is required to keep up with the water inflow. The result can be a variable speed DC backup system designed to operate with a high efficiency. The BBU system 100 can run the backup sump pump 112 at the best efficiency point (BEP) for normal operation, and can include additional capacity (via faster speeds) to account for larger inflows of water. The BEP is a performance point where a pump transfers input energy from an electric motor into fluid power with minimum losses to inefficiency. The BEP can be preprogrammed into the BBU system 100 for a variety of backup sump pump configurations.

In some embodiments, the BBU system 100 can include a variable speed drive operable to run the backup sump pump 102 at its BEP for most pumping conditions. The BBU system 100 can also run the backup sump pump 112 at other speeds, such as when extra capacity may be needed. The pressure transducer 212 can measure the rate of water rise, and can match pump output to BEP via the voltage regulator 264 (e.g., a potentiometer), unless inflow exceeds capacity. In this event, the voltage regulator 264 can speed up the backup sump pump 112 using a turbo boost function to increase output from the backup sump pump 112.

As described above, the pressure transducer 212 can measure the rate of water rise or water column level within the sump pit 52. The voltage regulator 264 can control the output voltage to the backup sump pump 112 based on the transducer reading, allowing the backup sump pump 112 to be run at variable speeds. In some embodiments, the pressure transducer 212 can be a Freescale Semiconductor MPX5010DP. In other embodiments, the pressure transducer 212 can be a Freescale Semiconductor MPX53DP coupled with an external op-amp to provide scaling and compensation that are built into the MPX5010DP.

Figure 22:
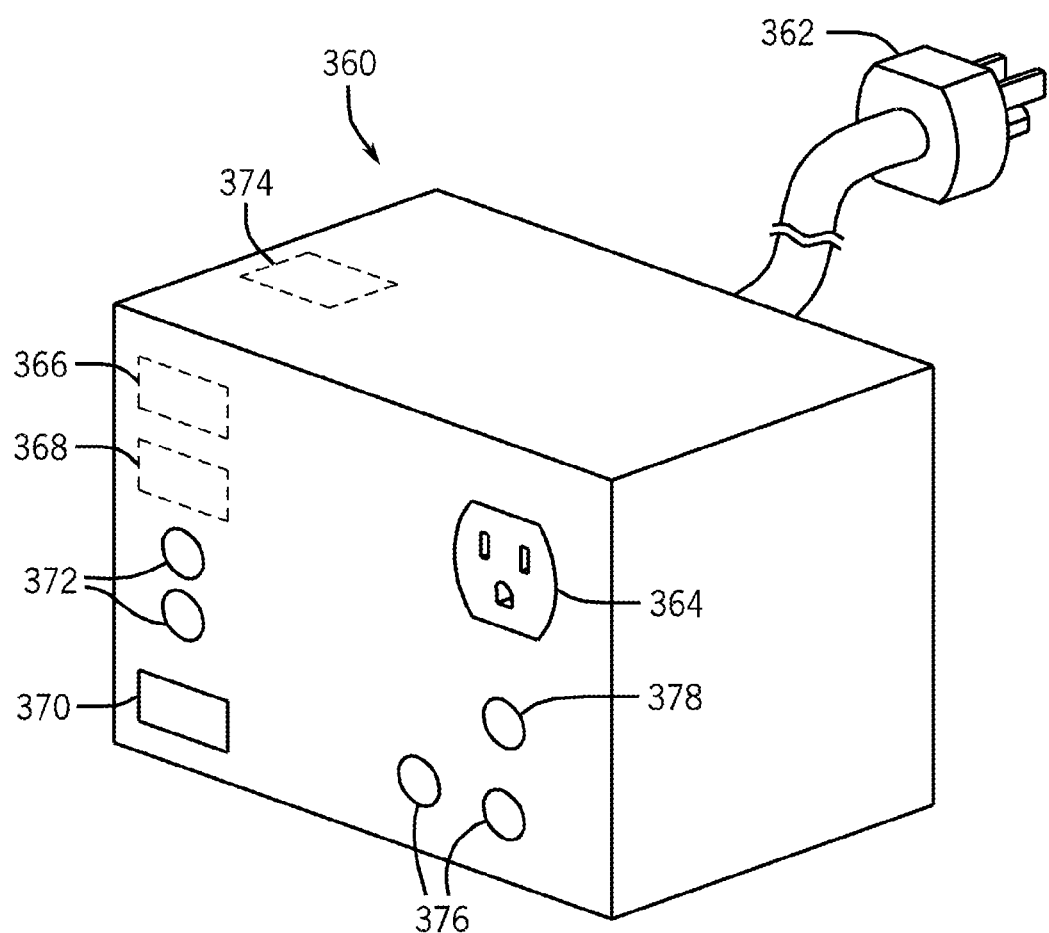
FIG. 22 is a perspective view of a control box usable with the pressure sensor of FIG. 21.

As shown in FIG. 22, in some embodiments, a control box 360 can be included with the pressure sensor 126 so the pressure sensor can be used independently of or in conjunction with the BBU system 100. The control box 360 can include a plug 362 to allow the control box to be plugged into 120 VAC wall power, and a power outlet, such as AC outlet 364, to allow a standard 120 VAC sump pump 130, or other AC or DC sump pumps, to be plugged into the control box 360 to receive AC or DC power.

The control box 360 can also include a pressure transducer 366 and a switch or relay 368 to operate one or more contacts 370. The pressure transducer 366 can serve the same purpose as pressure transducer 212. The contact 370 can be used by a user to trigger an event, such as initiation of an auto dialer or turning on a light (neither are shown). Various indicator devices, such as LEDs 372, can be used to display function and/or status information to a user. A remote communication feature 374 can also be included with the control box 360.

In some embodiments, the pressure sensor 126 can be coupled to the control box 360 using a plug 214 and socket 216 configuration, as previously described. In other embodiments, one or more pressure line connectors 376 can be accessible on the control box 360. Similarly, a high water alarm connector 378 can be included for connection with the high water level contact sensor 128.

FIG. 23 illustrates a method for controlling the speed of the backup sump pump 112. The control circuitry 152 can control the speed of the backup sump pump 112 instead of simply turning the backup sump pump 112 on or off. The pressure sensor 126 may be used in place of or in addition to a float switch, to determine when to turn the backup sump pump 112 on or off. In some embodiments, the pressure sensor 126 can provide a substantially continuous indication of the depth of the water in the sump pit 52. By sampling the depth and comparing consecutive samples, a determination can be made if the water is rising or falling. This information may then be used to adjust the speed of the backup sump pump 112 while pumping.

Any pump will have a best efficiency point (BEP), a speed at which it moves the most water per watt of power. At lower speeds, the amount of water moved falls off more quickly than the power used. At higher speeds, the amount of power used increases more rapidly than the amount of water moved. A pump will move the most gallons per charge of the battery if it is operated at the BEP. However, a storm may pour water into the sump faster than the pump, operated at BEP, can remove it. The following method describes how the control circuitry 152 adjusts the pump speed in such cases. The objective is to increase the speed above BEP no more than necessary to stay ahead of the in-flow. In some embodiments, the method can be run about once per second, although faster or slower is within the capability of the control circuitry 152.

The method can start at step 300. At step 302, the control circuitry 152 (as shown in FIG. 12) determines if the overflow contacts 258 are closed. The overflow contacts 258 serve as backup contacts in case of a pressure sensor 126 failure. If the overflow contacts 258 are closed, an overflow alarm 182 can be energized (step 304) and the backup sump pump 112 can be powered to run at maximum capacity (step 306). An overflow counter 268 can also be set to a predetermined time (step 308). In this example, the predetermined time is set to ten seconds. This is the time in seconds that the backup sump pump 112 will continue to run after the overflow contacts 258 are cleared, (i.e., opened), to draw the water down below the overflow contacts 258 so that the backup sump pump 112 is not rapidly cycled. The method can end at step 310.

If the overflow contacts 258 are not closed, the control circuitry 152 determines if the overflow counter 268 is at zero or another value (step 312). If the overflow counter 268 is not at zero, the overflow counter 268 can be decremented by a predetermined value, such as one (step 314). The method can end at step 316.

If the overflow counter 268 is at zero, the control circuitry 152 determines if the water is above the low set point (step 318). If the water is not above the low set point, the backup sump pump 112 can be stopped (step 320). The method can end at step 322.

If the water is above the low set point, the control circuitry 152 can determine if the backup sump pump 112 is running (step 324) by monitoring a current to the backup sump pump 112, for example. If the backup sump pump 112 is not running, the control circuitry 152 can determine if the water is above the high set point (step 326). If the water is not above the high set point, the method can end at step 328. If the water is above the high set point, the backup sump pump can be started (step 330). The method can then end at step 328.

If the backup sump pump 112 is running, the control circuitry 152 can determine if the water level is falling (step 332). If the water level is falling, the control circuitry 152 can determine if the speed of the backup sump pump 112 is at the BEP (step 334). If the speed of the backup sump pump 112 is at the BEP, the method can end at step 336. If the speed of the backup sump pump 112 is not at the BEP, the speed of the backup sump pump 112 can be decreased (step 338). The speed of the backup sump pump 112 can be decreased by decreasing the voltage to the backup sump pump 112, thereby reducing the speed of the backup sump pump 112. In some embodiments, the voltage can be decreased by about 0.5V each time the method is run, although higher and lower voltage changes are within the capability of the control circuitry 152. The method can then end at step 336.

If the water level is not falling, the control circuitry 152 can determine if the speed of the backup sump pump 112 is at the maximum (step 340). If the speed of the backup sump pump 112 is not at the maximum, the speed of the backup sump pump 112 can be increased (step 342). Similarly to decreasing the speed of the backup sump pump 112, the speed of the backup sump pump 112 can be increased by increasing the voltage to the backup sump pump 112, thereby increasing the speed of the backup sump pump 112. In some embodiments, the voltage can be increased by about 0.5V each time the method is run, although higher and lower voltage changes are within the capability of the control circuitry 152. The method can end at step 344.

If the water level is not falling, and the speed of the backup sump pump 112 is at the maximum, the overflow alarm 182 can be energized (step 346). The method can end at step 348.

In some embodiments, the BBU system 100 can include a local monitoring and/or test feature. In some embodiments, the control panel 154 can include a test/reset button 180, as shown in FIG. 13. In some embodiments, when a local user presses and releases the test/reset button 180, the control circuitry 152 can reset any active alarms. In some embodiments, when the local user presses and holds the test/reset button 180 for several seconds, the control circuitry 152 can initiate a dynamic system test. The dynamic system test can start the backup sump pump 112 for a predetermined amount of time, such as about one to three seconds, for example. The control circuitry 152 can also cycle the LEDs 160.

In some embodiments, the BBU system 100 can include a remote monitoring and/or test feature including the wireless controller 124. The relative current draw of the backup sump pump 112 can be monitored by the control circuitry 152 for the purpose of remotely determining if the backup sump pump 112 is functional or not. The pulse width of a PWM (pulse width modulator) 270 (as shown in FIG. 12) can be monitored, and based on the pulse width, multiple situations for alarms can be created. For example, if the pulse width is very narrow, then the backup sump pump 112 may be using minimal current, which can be an indication that there is no backup sump pump 112 connected or that there is an open circuit. If the pulse width is at or near a maximum, the backup sump pump 112 is likely drawing high current, which can be an indication that there is a dead short or a blocked rotor, for example. There can also be a pulse width range in the middle that can indicate a normal operation. These pulse width ranges can be used to trigger a local and/or remote alarm and/or a fault indication, for example.

The pulse width range feedback can also be used to provide feedback for a remote software application test function. The software application can be operable with a smartphone, for example, or other smart device, to access the BBU system 100 to provide an indication of the BBU system's operational status. The software application can be used to provide remote monitoring of the BBU system 100 including weekly test cycles and/or alerts, for example. In some embodiments, the wireless controller 124 can be programmed to transmit a response to a wireless remote device only if the wireless controller 124 is first queried by the remote device. In this way, the wireless controller 124 does not transmit wireless communications unless it is first asked to transmit a wireless communication.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A fluid level sensor remote monitoring system comprising:
    an inverted cup with a sealed top and an open bottom, the inverted cup defining an inner air space and having an inner pressure;
    an inner pressure tube extending from the inner air space and through the sealed top, the inner pressure tube connected to a first pressure line connector;
    an ambient pressure tube including an open end, the open end being positioned near the sealed top, the ambient pressure tube (i) in fluid communication with an air hole formed in the inverted cup, (ii) extending from the inverted cup, and (iii) connected to a second pressure line connector;
    a control box to monitor the inner pressure from the inner pressure tube and the ambient pressure from the ambient pressure tube, the first and second pressure line connectors connectable to the control box; and
    the control box including a wireless controller, a pressure transducer, and a switch, the wireless controller for wirelessly receiving monitoring instructions and wirelessly transmitting status data, the pressure transducer to measure the inner pressure and the ambient pressure, and based upon the measured inner pressure and the measured ambient pressure, to activate the switch.

2. The system of claim 1, and further comprising a plug to connect the control box to a wall power.

3. The system of claim 1, and further comprising a power outlet, the power outlet to provide an operating power to a sump pump.

4. The system of claim 1, wherein the switch triggers an event, the event comprising at least one of initiating an auto dialer, turning on an audible device, and turning on a light.

5. The system of claim 1, and further comprising an indicator device, the indicator device to display status information to a user.

6. The system of claim 1, and further comprising a contact sensor positioned near the sealed top, the contact sensor including a pair of conductive contacts; and
> a pair of conductors extending from the contact sensor, one conductor extending from each one of the pair of conductive contacts.

7. The system of claim 6, wherein the pair of conductors are connectable to the control box.

8. The system of claim 1, wherein the ambient pressure tube extends from the outside of the inverted cup to a plug.

9. The system of claim 1, which includes a plug, wherein the first pressure line connector and the second pressure line connector are integrated in the plug.

10. The system of claim 9, wherein (i) the control box includes a socket having one or more pressure receiver, (ii) the plug is connectable to the socket, and (iii) the one or more pressure receiver is configured to interface with at least the first pressure line connector and the second pressure line connector of the plug.

\* \* \* \* \*